(12) United States Patent
Mathews et al.

(10) Patent No.: US 7,642,330 B2
(45) Date of Patent: Jan. 5, 2010

(54) METHOD OF SELECTING POLYOLEFINS BASED ON RHEOLOGICAL PROPERTIES

(75) Inventors: Russel J. Mathews, Baker, LA (US); Brent A. Wall, Baton Rouge, LA (US); Aaron Monroe Young, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 205 days.

(21) Appl. No.: 11/095,438

(22) Filed: Mar. 31, 2005

(65) Prior Publication Data

US 2006/0223961 A1    Oct. 5, 2006

(51) Int. Cl.
*C08F 210/00* (2006.01)
*C08F 110/02* (2006.01)

(52) U.S. Cl. ...................... 526/348; 526/352
(58) Field of Classification Search .......... 526/352, 526/348
See application file for complete search history.

(56) References Cited

U.S. PATENT DOCUMENTS

| | | | |
|---|---|---|---|
| 3,276,844 A | 10/1966 | Davison et al. | 23/253 |
| 3,321,280 A | 5/1967 | Trotter, Jr. et al. | 23/230 |
| 3,384,745 A | 5/1968 | Markowitz et al. | 250/43.5 |
| 4,003,712 A | 1/1977 | Miller | 23/288 |
| 4,095,473 A | 6/1978 | Batchelor et al. | 73/433 |
| 4,159,965 A | 7/1979 | Sakurai et al. | |
| 4,336,352 A | 6/1982 | Sakurai et al. | |
| 4,341,891 A | 7/1982 | Gessell et al. | 528/483 |
| 4,603,173 A | 7/1986 | Mack et al. | 525/194 |
| 5,096,868 A | 3/1992 | Hsieh et al. | |
| 5,151,474 A | 9/1992 | Lange et al. | 526/60 |
| 5,534,472 A | 7/1996 | Winslow et al. | 502/116 |
| 5,624,877 A | 4/1997 | Bergmeister et al. | 502/120 |
| 5,648,439 A | 7/1997 | Bergmeister et al. | 526/96 |
| 5,671,591 A | 9/1997 | Fleenor | 53/452 |
| 6,201,077 B1 | 3/2001 | Bergmeister et al. | 526/104 |
| 6,204,346 B1 | 3/2001 | Bergmeister et al. | 526/104 |
| 6,433,103 B1 | 8/2002 | Guenther et al. | 525/333.8 |
| 6,479,597 B1 | 11/2002 | Long et al. | 526/59 |

(Continued)

FOREIGN PATENT DOCUMENTS

| | | |
|---|---|---|
| WO | WO 97/47682 | 12/1997 |
| WO | WO 01/77193 | 10/2001 |

*Primary Examiner*—William K Cheung

(57) ABSTRACT

This invention relates to a method for selecting a polyolefin having a die swell within a pre-selected range, the method comprising (a) obtaining from reference samples of a plurality of polyolefin batches a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining from a non-reference polyolefin sample a value for each variable in the equation from step (c) and calculating the predicted die swell from the equation from step (c); (e) comparing the predicted die swell of step (d) to the die swell within the pre-selected range, and (f) rejecting the non-reference polyolefin when the predicted die swell for the non-reference polyolefin is outside of the pre-selected range of the die swell. This invention relates to the use of the method in the production of blow-molded articles and in the control of a polyolefin reactor process.

25 Claims, 5 Drawing Sheets

U.S. PATENT DOCUMENTS

| | | |
|---|---|---|
| 6,528,136 B1 | 3/2003 | Ho et al. .................... 428/36.8 |
| 6,569,960 B2 | 5/2003 | Bergmeister et al. .......... 526/64 |
| 6,610,799 B1 | 8/2003 | Follestad et al. ............ 526/113 |
| 6,716,385 B2 * | 4/2004 | Ogawa et al. ............... 264/327 |
| 2003/0187173 A1 | 10/2003 | Kaszas |
| 2004/0266959 A1 | 12/2004 | Heslop et al. |

* cited by examiner

US 7,642,330 B2

METHOD OF SELECTING POLYOLEFINS BASED ON RHEOLOGICAL PROPERTIES

FIELD OF THE INVENTION

This invention relates to a method of identifying and selecting a polyolefin based on rheological measurements and controlling a polyolefin producing process based on the rheological measurements.

BACKGROUND OF THE INVENTION

Currently a manufacturer of polyolefins, such as polyethylene, may test die swell characteristics of the polyolefin by producing a blow-molded product, such as a bottle, and then measuring the die swell. For example, the swell properties of a dairy grade polyethylene blow-molded bottle is measured by using a Uniloy blow-molding apparatus to prepare a bottle and then measuring the tab width, i.e., the flashing at the bottom of the bottle. The term "tab width" is synonymous with "die swell." The processability of the polyolefin, as indicated by the swell analysis, is an important predictor of bottle quality. A polyolefin with too little swell will not properly fill the extremities of a mold, such as the handle of a bottle. A polyolefin with too much swell may form a molded article having flash in non-pinch-off areas and/or neck/tail flash which is difficult to trim. It is desirable to control swell in blow molding processes within acceptable limits.

Present methods of testing blow-molded articles, such as bottles, require large amounts, as much as 200 pounds, of polyolefin per batch and are labor intensive, time consuming and costly. There exists a need for a method of predicting die swell that reduces the labor, time, cost and amount of polyolefin tested per batch of polyolefin. There exists a need for a method of predicting, from one or more properties of the polyolefin, die swell of a polyolefin in a timely manner to permit modification of a polyolefin producing process to control the die swell of the polyolefin. There exists a need for a method of identifying and selecting polyolefins having predicted die swell within pre-selected ranges wherein the predicted die swell is based on rheological properties, other than die swell, of the polyolefin.

U.S. Pat. No. 4,603,173 discloses calculating flare swell percent and tube weight values for a polyolefin using a linear least squares fit method, but did not suggest or teach the use of partial least squares regression calculations for die swell correlation to other polyolefin properties.

U.S. Pat. No. 5,534,472 discloses the use of a Rheometrics Dynamic Analyzer RDA2 to measure dynamic storage modulus and loss modulus of certain ethylene-hexene copolymers prepared using a vanadium-containing catalyst and an aluminum containing co-catalyst, but did not suggest or teach the use of partial least squares regression calculations for die swell correlation to other polyolefin properties.

U.S. Pat. No. 6,479,597 B1 discloses the use of Raman spectroscopy to develop an equation for prediction hydrogen concentration in a polypropylene reactor using a regression analysis.

Additional references of interest include: U.S. Pat. Nos. 3,276,844; 3,321,280; 3,384,745; 4,003,712; 4,095,473; 4,341,891; 5,151,474; 5,624,877; 5,648,439; 5,671,591; 6,201,077 B1; 6,204,346 B1; 6,433,103 B1; 6,528,136 B1; 6,569,960 B2; and 6,610,799 B1.

SUMMARY OF THE INVENTION

This invention relates to a method for selecting a polyolefin having a predicted die swell within a pre-selected range comprising (a) obtaining, from reference samples of a plurality of polyolefin batches, a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining from a non-reference polyolefin sample a value for each variable in the equation from step (c) and calculating the predicted die swell from the equation from step (c); (e) comparing the predicted die swell of step (d) to the die swell within the pre-selected range, and (f) rejecting the non-reference polyolefin when the predicted die swell for the non-reference polyolefin is outside of the pre-selected range of the die swell.

This invention relates to a method for manufacturing a blow-molded article having a predicted die swell within a pre-selected range comprising (a) obtaining, from reference samples of a plurality of polyolefin batches, a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining from a non-reference polyolefin sample a value for each variable in the equation from step (c) and calculating the predicted die swell from the equation from step (c); (e) comparing the predicted die swell of step (d) to the pre-selected range, and (f) blow-molding the polyolefin having the predicted die swell within the pre-selected range to form the blow-molded article.

This invention relates to a method of controlling a polyolefin reactor comprising (a) obtaining, from reference samples of a plurality of polyolefin batches, a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining, from a non-reference polyolefin, a value for each variable in the equation from step (c) and calculating the predicted die swell from the equation from step (c); (e) comparing the predicted die swell of step (d) to a control value for die swell; and (f) modifying at least one reactor condition to reduce a difference between the control value and the predicted die swell for the polyolefin sample from the reactor.

DETAILED DESCRIPTION

Figure 1:
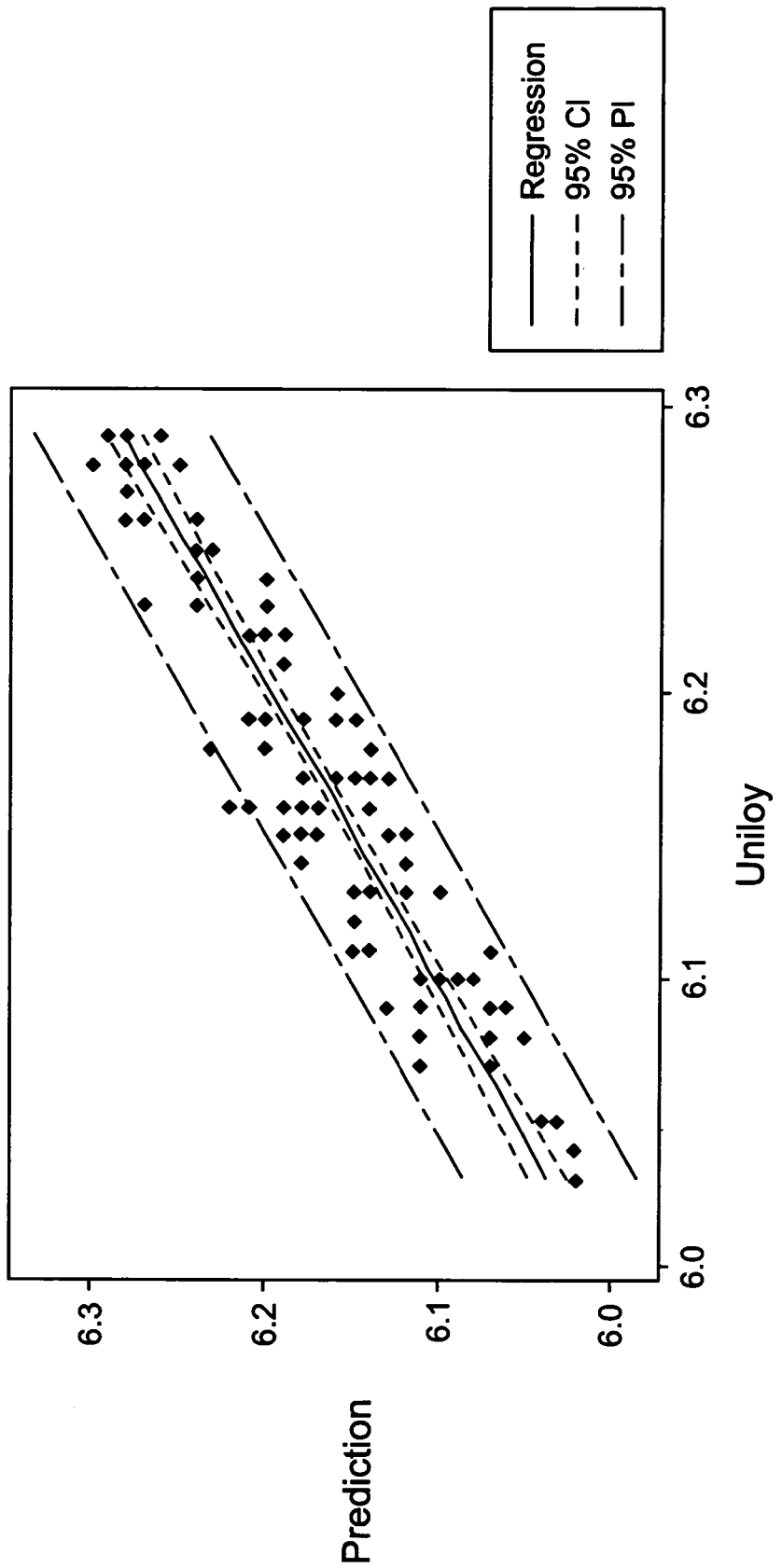
FIG. 1 shows the correlation between predicted die swell using Equation 1 and Uniloy measurements for the polyethylene pellet data in Table 1.
Figure 2:
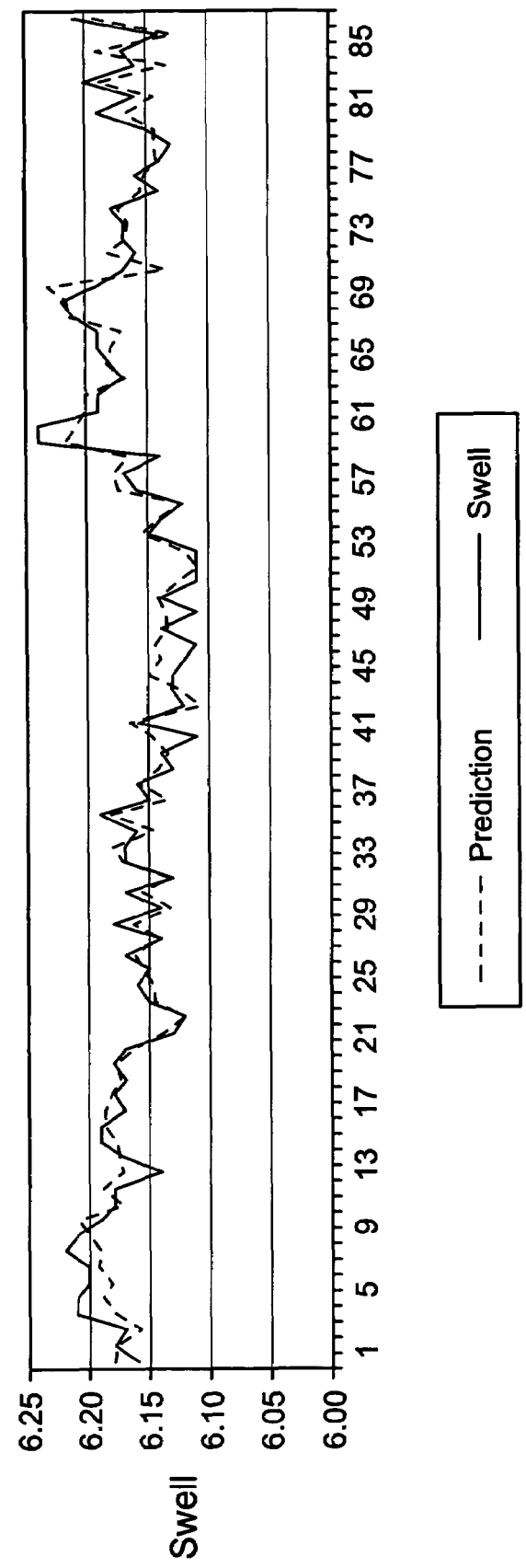
FIG. 2 shows the correlation between predicted die swell using Equation 2 and Uniloy measurements for the polyethylene powder data in Table 2.
Figure 3:
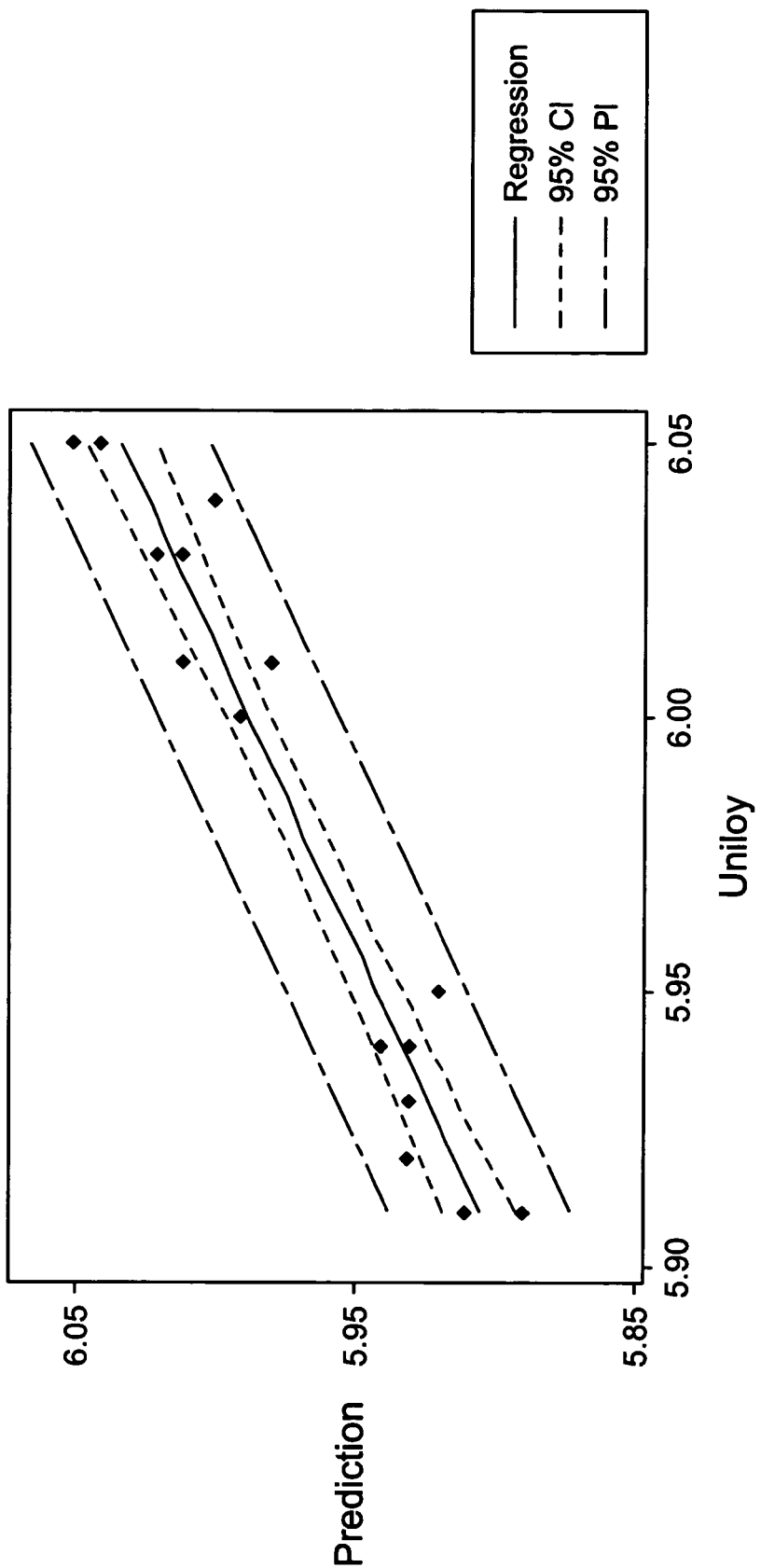
FIG. 3 shows the correlation between predicted die swell using Equation 3 and Uniloy measurements for the polyethylene pellet data in Table 3.
Figure 4:
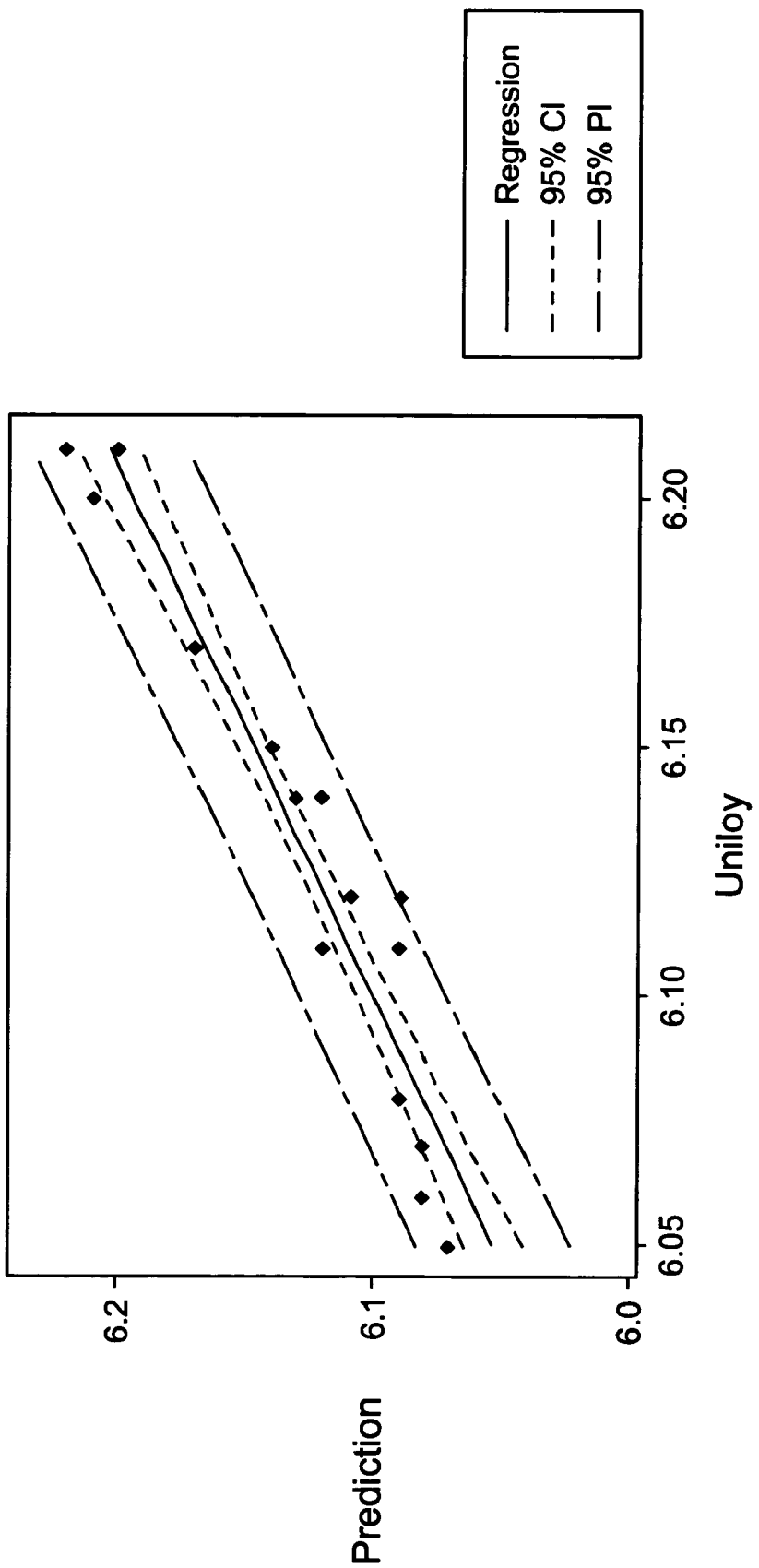
FIG. 4 shows the correlation between predicted die swell using Equation 4 and Uniloy measurements for the polyethylene pellet data in Table 4.
Figure 5:
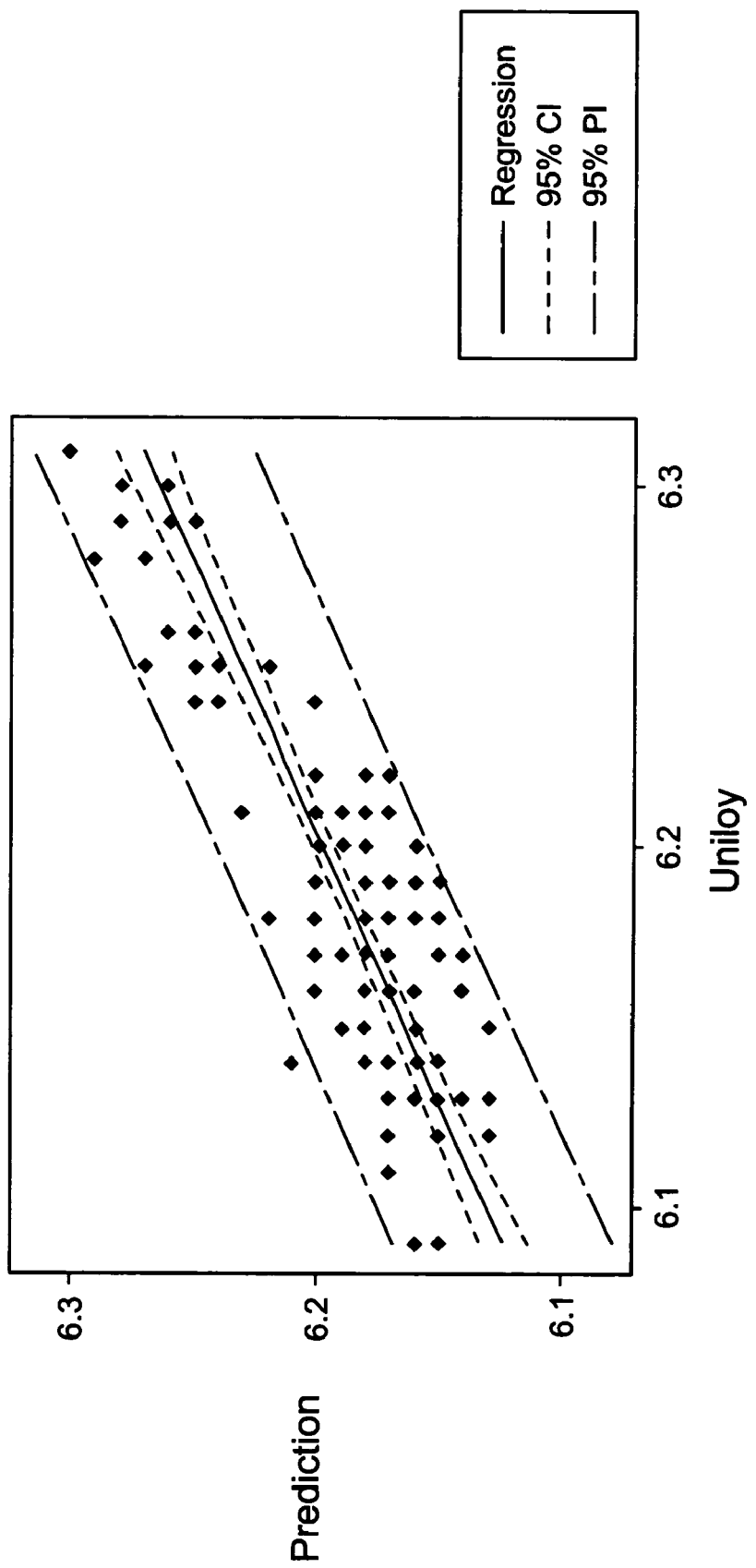
FIG. 5 shows the correlation between predicted die swell using Equation 5 and Uniloy measurements for the polyethylene pellet data in Table 5.

Applicants have developed a method of predicting die swell of a polyolefin from one or more properties of the polyolefin, a method for selecting a polyolefin having a predetermined die swell, a method for manufacturing a blow-molded article having a predicted die swell, and a method for modification of a polyolefin producing process to control the die swell of the polyolefin. The terms "pre-selected range" or "control value" used in reference to die swell typically refer to die swell values taken from a product manufacturing specification or product sales specification, which may be different for different polyolefins or different grades of the same polyolefin.

In one embodiment, this invention relates to a method for selecting a polyolefin having a predicted die swell within a pre-selected range comprising (a) obtaining, from reference samples of a plurality of polyolefin batches, a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining, from a non-reference polyolefin sample, a value for each variable in the equation from step (c) and calculating the predicted die swell from the equation from step (c); (e) comparing the predicted die swell of step (d) to the die swell within the pre-selected range, and (f) rejecting the non-reference polyolefin when the predicted die swell for the non-reference polyolefin is outside of the pre-selected range of the die swell.

This method of predicting die swell permits the identification and selection of a polyolefin batch that will have an acceptable die swell for a die having a slit of a given width.

The regression analysis used in any embodiment according to the present invention includes all conventional regression analysis methods. The regression analysis method includes, but is not limited to, partial least squares calculations. Unless otherwise noted, all partial least squares calculations were performed using the program MINITAB™ Release 13.32 sold by MINITAB, Inc. All embodiments according to the present invention may optionally include a computer system for acquiring data and/or storing data used in the regression analysis and for performing the regression analysis calculations.

In one embodiment according to the present invention, the polyolefin comprises a polyethylene homopolymer, a polyethylene copolymer, a polypropylene homopolymer or a polypropylene copolymer. In another embodiment, the polyolefin is selected from a dairy grade polyethylene, a household industrial chemical grade polyethylene and a high load melt index polyethylene.

The reference samples are a population of samples for a polyolefin composition that encompasses the variation of properties typically found in the polyolefin produced over an extended period of time. For example, typical process variation for a polyolefin may result in a die swell ranging from about 6.08 inches to about 6.24 inches for samples produced at different times. The non-reference polyolefin is any sample from a batch of polyolefin of the same formulation as the reference samples, but that was not included in the reference samples. If the composition of the reference samples is altered or if the production conditions are altered, a new set of references samples may be obtained and tested to determine whether the properties of the polyolefin have changed sufficiently to require that a regression analysis be conducted to generate a new correlation equation.

Typically, a data set of one or more properties was obtained from a set of reference samples by the test methods described below. Oscillation disk rheology (ODR) may be used to obtain data, such as tangent delta (hereafter "tan (delta)"), crossover frequency, and crossover point using, for example, an RDA III rheometer. In all embodiments the reference samples and non-reference samples may be in the form of a powder or a pellet. The properties from which the data sets may be constructed include, but are not limited to, tan (delta), melt index, polydispersity index, crossover frequency and crossover point. The tan (delta) data may be acquired at a single temperature or at multiple temperatures, for example 150° C. and 155° C. Tan (delta) data are typically acquired at temperatures ranging from about 145° C. to about 155° C. Tan (delta) is the ratio of loss modulus divided by storage modulus. Die swell data, typically Uniloy tab width data, is obtained from the same set of reference samples. The total sample size required for testing each property, such as tan (delta) and melt index, is typically about 1 gram, rather than multi-pound samples required by conventional blow molding test methods. The total time involved for test sample preparation and testing for the other properties is also generally much less than the time needed to prepare and test a blow-molded article.

In one embodiment, once the data sets of one or more properties and the die swell for a set of reference samples were obtained, the die swell data was correlated to one or more of the properties using a partial least squares calculation to produce an equation describing a model for predicting die swell from measurements of properties of the polyolefin. The equation describing the model for predicting die swell has one variable for each type of data included in the partial least squares calculation. The partial least squares calculation may be performed by any conventional method, one example of which is MINITAB™ Release 13.32 sold by MINITAB, Inc, for all embodiments of the present invention.

In one embodiment according to the present invention the tan (delta) at 150° C. data for the pellet samples were correlated to the Uniloy tab width data for the same samples using a partial least squares calculation. In one embodiment according to the present invention both the tan (delta) at 150° C. data and the tan (delta) at 155° C. data for the pellet samples were correlated to the Uniloy tab width data for the same samples using a partial least squares calculation.

In another embodiment according to the present invention the tan (delta) at 150° C. data, the tan (delta) at 155° C. data and the melt index data for the pellet samples were correlated to the Uniloy tab width data for the same samples using a partial least squares calculation in MINITAB™ to generate the following Equation 1, having a variable for each property data set included in the partial least squares calculation, as a model for predicting die swell:

Predicted die swell=(24*Tan (delta) at 155° C.)+(2.225*Melt Index)−(22.46*Tan (delta) at 150° C.)+0.7959     Equation 1

Once the predicted die swell equation has been calculated for a given polyolefin formulation, a non-reference sample of polyolefin was tested for each property in the predicted die swell equation. The predicted die swell value for the particular batch of polyolefin was calculated from the predicted die swell equation. For example, in Equation 1 the tan (delta) at 150° C., tan (delta) at 155° C. and the melt index are measured for a non-reference polyolefin sample. The values for the tan (delta) at 150° C., tan (delta) at 155° C. and the melt index are inserted into Equation 1 and a predicted swell value for the polyolefin is calculated. This sampling, testing and calculation, after the equation has been generated, are typically completed in less than two hours. In contrast, sampling and preparation of blow-molded bottles and measurement of the Uniloy tab width may take up to eight hours.

In another embodiment according to the present invention the tan (delta) at 150° C. data for powder samples were correlated to the Uniloy tab width data for the same samples using a partial least squares calculation. In another embodiment according to the present invention, the tan (delta) at 150° C. data and the tan (delta) at 155° C. data were correlated to the Uniloy swell data for powder samples by a partial least squares calculation. In another embodiment according to the present invention the tan (delta) at 150° C. data, the tan (delta) at 155° C. data, and the melt index data for powder samples were correlated to the Uniloy tab width data for the same samples using a partial least squares calculation.

In another embodiment, this invention relates to a method for manufacturing a blow-molded article having a predicted die swell within a pre-selected range comprising (a) obtaining, from reference samples of a plurality of polyolefin batches, a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining from a non-reference polyolefin sample a value for each variable in the equation from step (c) and calculating the predicted die swell from the equation from step (c); (e) comparing the predicted die swell of step (d) to the die swell within the pre-selected range, and (f) blow-molding the polyolefin sample, having the predicted die swell within the pre-selected range, to form the blow-molded article.

In another embodiment, this invention relates to a method of controlling a polyolefin reactor comprising (a) obtaining from reference samples of a plurality of polyolefin batches a data set for at least one property, other than die swell, of the polyolefin; (b) obtaining a die swell data set from the reference samples of the polyolefin; (c) correlating the at least one property and the die swell data set using a regression analysis to generate an equation for predicting the die swell as a function of the at least one property from step (a); (d) obtaining from a non-reference polyolefin sample a value for each variable in the equation from step (c) and calculating the predicted die swell from the equation from step (c); (e) comparing the predicted die swell of step (d) a control value for die swell; and (f) modifying at least one reactor condition to reduce a difference between the control value and the predicted die swell for the polyolefin sample from the reactor.

In one embodiment, steps (a) through (f) are conducted as described above. Step (f) changes the current predicted swell value by modifying a condition in the reactor selected from temperature, olefin concentration, hydrogen concentration or a combination of the conditions in the reactor. For example, if the predicted die swell is too high, then the hydrogen concentration is increased or if the predicted die swell is too low, then the hydrogen concentration is decreased.

The following definitions are useful in understanding the present invention.

Various types of polyethylenes are known in the art. Low density polyethylene ("LDPE") can be prepared at high pressure using free radical initiators and typically has a density in the range of 0.916-0.940 g/cm$^3$. LDPE is also known as "branched" or "heterogeneously branched" polyethylene because of the relatively large number of long chain branches extending from the main polymer backbone. Polyethylene in the same density range, i.e., 0.915 to 0.940 g/cm$^3$, which is linear and does not contain large quantities of long chain branching is also known; this "linear low density polyethylene" ("LLDPE") can be produced with conventional Ziegler-Natta catalysts or with single site catalysts, such as metallocene catalysts, discussed further below. Relatively higher density LDPE or LLDPE, typically in the range of 0.928 to 0.940 g/cm$^3$ are sometimes referred to as medium density polyethylene ("MDPE") or Linear Medium Density Polyethylene ("LMDPE"). Polyethylenes having still greater density are the high density polyethylenes ("HDPEs"), i.e., polyethylenes having densities greater than 0.940 g/cm$^3$, and are generally prepared with Ziegler-Natta catalysts, chrome catalysts or even single site catalysts such as metallocene catalysts. Very low density polyethylene ("VLDPE") is also known. VLDPEs can be produced by a number of different processes yielding polymers with different properties, but can be generally described as polyethylenes having a density less than 0.915 g/cm$^3$, typically 0.890 up to 0.915 g/cm$^3$ or 0.900 up to 0.915 g/cm$^3$. VLDPEs produced using metallocene or other single-site catalysts, as discussed further below, are referred to as a type of plastomer. Plastomers having a density as low as 0.860 g/cm$^3$ are commercially available. Polyethylenes produced using single-site catalysts are referred to herein using the prefix "m" before one of the above designations, depending on density, e.g., mLLDPE or mVLDPE. The densities above are those measured using ASTM D-1505.

Polyethylene generally may also be characterized as homopolymers or copolymers of ethylene. Polymers having more than two types of monomers, such as terpolymers, are also included within the term "copolymer" as used herein.

The comonomers that are useful in the present invention include alpha-olefins, such as $C_3$-$C_{20}$ alpha-olefin and preferably $C_3$-$C_{12}$ alpha-olefins. The alpha-olefin comonomer can be linear or branched, and two or more comonomers can be used, if desired. Examples of suitable comonomers include linear $C_3$-$C_{12}$ alpha-olefins, and alpha-olefins having one or more $C_1$-$C_3$ alkyl branches, or an aryl group. Specific examples include propylene; 3-methyl-1-butene; 3,3-dimethyl-1-butene; 1-pentene; 1-butene; 1-pentene with one or more methyl, ethyl or propyl substituents; 1-hexene; 1-hexene with one or more methyl, ethyl or propyl substituents; 1-heptene with one or more methyl, ethyl or propyl substituents; 1-decene; 1-dodecene; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

In one aspect of the invention, the polyolefin is selected from polypropylene homopolymer, polypropylene copolymers, and blends thereof. The homopolymer may be atactic polypropylene, isotactic polypropylene, syndiotactic polypropylene and blends thereof. The copolymer can be a random copolymer, a block copolymer, and blends thereof. In particular, polymer blends include so called impact copolymers, elastomers and plastomers, any of which may be physical blends or in situ blends of polypropylene and polypropylene copolymer. The method of making the polypropylene is not critical, as it can be made by slurry, solution, or gas phase processes, and by using either Ziegler-Natta-type catalysts, metallocene-type catalysts, or a combination thereof. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al., *Selectivity in Propene Polymerization with Metallocene Catalysts*, 100 CHEM. REV. 1253-1345 (2000); and I, II METALLOCENE-BASED POLYOLEFINS (Wiley & Sons 2000).

The polyolefin may be a propylene homopolymer. A desirable propylene homopolymer has a molecular weight distribution (Mw/Mn) ranging from 1.5 to 10, and from 2.0 to 7 in another embodiment, and from 2.0 to 5 in yet another embodiment, and from 2.0 to 4 in yet another embodiment. The Gardner impact strength, tested on 0.125 inch disk at 23° C., of the propylene homopolymer may range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus of the propylene homopolymer ranges from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C., 2.16 kg) of propylene homopolymer ranges from 0.1 dg/min to 2500 dg/min in one embodiment, and from 0.3 to 500 dg/min in another embodiment.

The polypropylene homopolymer or copolymer useful in the present invention may have some level of isotacticity. Thus, in one embodiment, isotactic polypropylene is a useful polyolefin, and highly isotactic polypropylene in another embodiment. As used herein, "isotactic" is defined as having at least 10% isotactic pentads according to analysis by $^{13}$C-NMR. As used herein, "highly isotactic" is defined as having at least 60% isotactic pentads according to analysis by $^{13}$C-NMR. In a desirable embodiment, a polypropylene homopolymer having at least 85% isotacticity is the polyolefin, and at least 90% isotacticity in yet another embodiment.

In another embodiment of the invention, the polyolefin is a propylene copolymer, either random, or block, of propylene derived units and units selected from ethylene and $C_4$ to $C_{20}$ α-olefin derived units, and from ethylene and $C_4$ to $C_{10}$ α-olefin derived units in another embodiment. The ethylene or $C_4$ to $C_{20}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_4$ to $C_{20}$ α-olefin derived units in any combination of any upper wt % limit with any lower wt % limit described herein. The propylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 in yet another embodiment, wherein a desirable copolymer may comprise any upper molecular weight limit with any lower molecular weight limit described herein.

In yet another embodiment, the Gardner impact strength, tested on 0.125 inch disk at 23° C., of the propylene copolymer ranges from 20 in-lb to 1000 in-lb, and from 30 in-lb to 500 in-lb in another embodiment, and from 40 in-lb to 400 in-lb in yet another embodiment. Further, the propylene copolymer may possess a 1% secant flexural modulus ranging from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C.) of desirable copolymers ranges from 0.1 dg/min to 2500 dg/min in one embodiment, and from 0.1 to 500 dg/min in another embodiment.

Another suitable polyolefin comprises a blend of a polypropylene homopolymer or copolymer with a so-called "plastomer". The plastomers that are useful in the present invention may be described as polyolefin copolymers having a density of from 0.85 to 0.915 g/cm$^3$ and a melt index (MI) between 0.10 and 30 dg/min (ASTM D 1238; 190° C., 2.1 kg). In one embodiment, the useful plastomer is a copolymer of ethylene derived units and at least one of $C_3$ to $C_{10}$ α-olefin derived units, the copolymer having a density in the range of less than 0.915 g/cm$^3$. The amount of comonomer ($C_3$ to $C_{10}$ α-olefin derived units) present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer useful in the invention has a melt index (MI) of between 0.10 and 20 dg/min in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus (ASTM D 790) of useful plastomers ranges from 10 MPa to 150 MPa in one embodiment, and from 20 MPa to 100 MPa in another embodiment. Further, the plastomer that is useful in compositions of the present invention has a melting temperature ($T_m$) of from 30° C. to 80° C. (first melt peak) and from 50° C. to 125° C. (second melt peak) in one embodiment, and from 40° C. to 70° C. (first melt peak) and from 50° C. to 100° C. (second melt peak) in another embodiment.

EXAMPLES

Tests and Materials.

Samples of plaques prepared from polyolefin pellets according to ASTM D-4703 were placed in the RDA III analyzer between an upper fixture and a lower fixture that are parallel to each other. The samples placed in the RDA III had a 25-mm diameter and 2.0 mm thickness. The upper fixture is connected to a transducer. The lower fixture is rotated by a motor at a strain of 10% and a frequency ranging from about 1 to about 100 radians per second. During the test, the temperature was increased from 145° C. to 155° C. at a rate of 4° C./minute or maintained at a constant temperature. The total test time is about 10 minutes.

Melt Index

Melt index (MI or $I_2$) was determined according to ASTM D-1238, 190° C., 2.16-kg mass, expressed in grams per 10 minutes (g/10 min), unless otherwise stated. High load melt index (HLMI or $I_{21}$) was determined according to ASTM D-1238-F.

Plaque Preparation

Plaque preparation was in accordance with ASTM D-4703, procedure C. The temperature of the platens of the press was cooled at a rate of about 15° C. per minute, plus or minus 2° C.

Abbreviations Used in Tables
tan155=tan (delta) at 155° C.
tan150=tan (delta) at 150° C.
MI=melt index
tan155/MI=tan (delta) at 155° C./melt index ODR Prediction=calculated die swell
PDI=polydispersity index
Frequency=radians per second
Crossover Frequency is the frequency at which storage modulus equals loss modulus.

Example 1

An HDPE, sold by ExxonMobil Chemical Company under the designation AD60007 and useful for making blow-molded dairy bottles, was tested for tan (delta) at 150 C, tan (delta) at 155 C and melt index. The plaques for testing were prepared according to ASTM-D4703. Melt index testing was conducted according to ASTM-D1238 with a load of 2.16 kg. The oscillation dynamic rheology was conducted with a Rheometric Dynamic Analyzer III using 25-mm parallel plates, a temperature sweep from 145° C. to 155° C. at 4° C./minute, with a strain of 10% and a frequency of 12.588 radians per second. The data is listed in Table 1. Graph 1 shows correlation between the actual die swell measured on articles made on a Uniloy blow molding apparatus versus the predicted die swell based on Equation 1. The partial least squares regression analysis of the data in Table 1 provided the Equation 1:

Predicted die swell=(24*tan (delta) at 155° C.)+
(2.225*melt index)+(1.314*tan (delta) at 155°
C./melt index)−(22.46*tan (delta) at 150° C.)+
0.7959      Equation 1

TABLE 1

AD60007 Swell Model (Temp Sweep)

| Batch | tan155 | MI | tan155/MI | tan150 | ODR Prediction | Uniloy Swell |
|---|---|---|---|---|---|---|
| 1 | 1.034 | 0.74 | 1.397 | 1.022 | 6.14 | 6.14 |
| 2 | 1.071 | 0.83 | 1.290 | 1.06 | 6.23 | 6.25 |
| 3 | 1.071 | 0.83 | 1.290 | 1.058 | 6.28 | 6.26 |
| 4 | 1.069 | 0.85 | 1.258 | 1.055 | 6.30 | 6.28 |
| 5 | 0.9996 | 0.65 | 1.538 | 0.9879 | 6.07 | 6.07 |
| 6 | 1.006 | 0.69 | 1.458 | 0.994 | 6.07 | 6.08 |
| 7 | 1.06 | 0.81 | 1.309 | 1.046 | 6.26 | 6.29 |
| 8 | 1.065 | 0.71 | 1.500 | 1.052 | 6.28 | 6.29 |
| 9 | 1.066 | 0.73 | 1.460 | 1.053 | 6.27 | 6.28 |
| 10 | 1.07 | 0.84 | 1.274 | 1.057 | 6.28 | 6.28 |
| 11 | 1.079 | 0.82 | 1.316 | 1.067 | 6.28 | 6.27 |
| 12 | 1.052 | 0.8 | 1.315 | 1.038 | 6.24 | 6.25 |
| 13 | 1.046 | 0.82 | 1.276 | 1.035 | 6.15 | 6.13 |
| 14 | 1.087 | 0.84 | 1.294 | 1.078 | 6.24 | 6.24 |
| 15 | 1.071 | 0.81 | 1.322 | 1.058 | 6.28 | 6.26 |
| 16 | 1.058 | 0.86 | 1.230 | 1.044 | 6.27 | 6.26 |
| 17 | 1.066 | 0.84 | 1.269 | 1.054 | 6.24 | 6.25 |
| 18 | 1.033 | 0.66 | 1.565 | 1.023 | 6.14 | 6.11 |
| 19 | 1.072 | 0.83 | 1.292 | 1.061 | 6.24 | 6.26 |
| 20 | 1.032 | 0.77 | 1.340 | 1.021 | 6.11 | 6.07 |
| 21 | 1.024 | 0.75 | 1.365 | 1.013 | 6.08 | 6.07 |
| 22 | 1.013 | 0.7 | 1.447 | 1.004 | 6.02 | 6.04 |
| 23 | 0.9875 | 0.68 | 1.452 | 0.9748 | 6.02 | 6.03 |
| 24 | 0.9864 | 0.7 | 1.409 | 0.973 | 6.03 | 6.05 |
| 25 | 1.016 | 0.68 | 1.494 | 1.007 | 6.04 | 6.05 |
| 26 | 1.007 | 0.66 | 1.526 | 0.9963 | 6.06 | 6.09 |
| 27 | 1.071 | 0.88 | 1.217 | 1.058 | 6.29 | 6.29 |
| 28 | 1.054 | 0.77 | 1.369 | 1.042 | 6.20 | 6.23 |
| 29 | 1.026 | 0.74 | 1.386 | 1.014 | 6.11 | 6.09 |
| 30 | 1.031 | 0.78 | 1.322 | 1.02 | 6.10 | 6.09 |
| 31 | 1.064 | 0.83 | 1.282 | 1.052 | 6.24 | 6.23 |
| 32 | 1.069 | 0.79 | 1.353 | 1.057 | 6.25 | 6.28 |
| 33 | 1.032 | 0.74 | 1.395 | 1.021 | 6.11 | 6.10 |
| 34 | 1.035 | 0.67 | 1.545 | 1.024 | 6.16 | 6.17 |
| 35 | 1.044 | 0.69 | 1.513 | 1.032 | 6.20 | 6.19 |
| 36 | 1.034 | 0.67 | 1.543 | 1.022 | 6.18 | 6.19 |
| 37 | 1.059 | 0.78 | 1.358 | 1.048 | 6.19 | 6.21 |
| 38 | 1.057 | 0.77 | 1.373 | 1.046 | 6.19 | 6.16 |
| 39 | 1.031 | 0.73 | 1.412 | 1.019 | 6.13 | 6.09 |
| 40 | 1.054 | 0.75 | 1.405 | 1.043 | 6.18 | 6.17 |
| 41 | 1.039 | 0.69 | 1.506 | 1.028 | 6.16 | 6.19 |
| 42 | 1.033 | 0.68 | 1.519 | 1.021 | 6.17 | 6.16 |
| 43 | 1.056 | 0.76 | 1.389 | 1.044 | 6.21 | 6.19 |
| 44 | 1.053 | 0.74 | 1.423 | 1.041 | 6.20 | 6.18 |
| 45 | 1.047 | 0.72 | 1.454 | 1.036 | 6.17 | 6.17 |
| 46 | 1.048 | 0.73 | 1.436 | 1.036 | 6.19 | 6.16 |
| 47 | 1.052 | 0.8 | 1.315 | 1.041 | 6.17 | 6.16 |
| 48 | 1.06 | 0.8 | 1.325 | 1.05 | 6.17 | 6.17 |
| 49 | 1.01 | 0.75 | 1.347 | 0.9986 | 6.05 | 6.08 |
| 50 | 1.031 | 0.77 | 1.339 | 1.021 | 6.08 | 6.10 |
| 51 | 1.032 | 0.76 | 1.358 | 1.02 | 6.13 | 6.09 |
| 52 | 1.029 | 0.77 | 1.336 | 1.019 | 6.07 | 6.09 |
| 53 | 1.046 | 0.73 | 1.433 | 1.035 | 6.16 | 6.20 |
| 54 | 1.042 | 0.71 | 1.468 | 1.031 | 6.16 | 6.20 |
| 55 | 1.068 | 0.84 | 1.271 | 1.055 | 6.27 | 6.23 |
| 56 | 1.054 | 0.79 | 1.334 | 1.042 | 6.20 | 6.24 |
| 57 | 1.029 | 0.69 | 1.491 | 1.018 | 6.12 | 6.13 |
| 58 | 1.053 | 0.81 | 1.300 | 1.043 | 6.15 | 6.19 |
| 59 | 1.061 | 0.77 | 1.378 | 1.049 | 6.22 | 6.16 |
| 60 | 1.047 | 0.7 | 1.496 | 1.036 | 6.18 | 6.16 |
| 61 | 1.051 | 0.76 | 1.383 | 1.039 | 6.19 | 6.15 |
| 62 | 1.038 | 0.75 | 1.384 | 1.027 | 6.13 | 6.15 |
| 63 | 1.048 | 0.66 | 1.588 | 1.037 | 6.21 | 6.16 |
| 64 | 1.025 | 0.71 | 1.444 | 1.013 | 6.12 | 6.15 |
| 65 | 1.03 | 0.7 | 1.471 | 1.018 | 6.14 | 6.17 |
| 66 | 1.044 | 0.75 | 1.392 | 1.032 | 6.17 | 6.17 |
| 67 | 1.051 | 0.77 | 1.365 | 1.039 | 6.19 | 6.16 |
| 68 | 1.054 | 0.79 | 1.334 | 1.043 | 6.18 | 6.17 |
| 69 | 1.047 | 0.82 | 1.277 | 1.036 | 6.16 | 6.20 |
| 70 | 1.054 | 0.79 | 1.334 | 1.042 | 6.20 | 6.22 |
| 71 | 1.049 | 0.76 | 1.380 | 1.036 | 6.21 | 6.22 |
| 72 | 1.044 | 0.71 | 1.470 | 1.032 | 6.19 | 6.22 |
| 73 | 1.038 | 0.76 | 1.366 | 1.027 | 6.13 | 6.17 |
| 74 | 1.03 | 0.68 | 1.515 | 1.019 | 6.13 | 6.15 |
| 75 | 1.023 | 0.67 | 1.527 | 1.014 | 6.07 | 6.11 |
| 76 | 1.03 | 0.71 | 1.451 | 1.02 | 6.09 | 6.10 |
| 77 | 1.04 | 0.75 | 1.387 | 1.029 | 6.14 | 6.18 |
| 78 | 1.039 | 0.73 | 1.423 | 1.029 | 6.12 | 6.14 |
| 79 | 1.017 | 0.7 | 1.453 | 1.006 | 6.08 | 6.10 |
| 80 | 1.026 | 0.71 | 1.445 | 1.015 | 6.10 | 6.10 |
| 81 | 1.03 | 0.73 | 1.411 | 1.019 | 6.11 | 6.08 |
| 82 | 1.033 | 0.84 | 1.230 | 1.022 | 6.12 | 6.13 |
| 83 | 1.028 | 0.74 | 1.389 | 1.017 | 6.10 | 6.13 |
| 84 | 1.042 | 0.76 | 1.371 | 1.031 | 6.14 | 6.13 |
| 85 | 1.045 | 0.74 | 1.412 | 1.033 | 6.18 | 6.15 |
| 86 | 1.041 | 0.73 | 1.426 | 1.03 | 6.14 | 6.16 |
| 87 | 1.051 | 0.76 | 1.383 | 1.041 | 6.15 | 6.17 |
| 88 | 1.064 | 0.8 | 1.330 | 1.052 | 6.23 | 6.18 |
| 89 | 1.053 | 0.78 | 1.350 | 1.041 | 6.20 | 6.19 |
| 90 | 1.034 | 0.71 | 1.456 | 1.022 | 6.15 | 6.15 |
| 91 | 1.03 | 0.7 | 1.471 | 1.019 | 6.12 | 6.13 |
| 92 | 1.037 | 0.73 | 1.421 | 1.025 | 6.15 | 6.13 |
| 93 | 1.031 | 0.7 | 1.473 | 1.019 | 6.12 | 6.12 |
| 94 | 1.038 | 0.69 | 1.504 | 1.027 | 6.15 | 6.11 |
| 95 | 1.03 | 0.69 | 1.493 | 1.021 | 6.08 | 6.10 |
| 96 | 1.048 | 0.76 | 1.379 | 1.036 | 6.18 | 6.14 |
| 97 | 1.04 | 0.74 | 1.405 | 1.03 | 6.12 | 6.14 |
| 98 | 1.041 | 0.72 | 1.446 | 1.029 | 6.17 | 6.15 |
| 99 | 1.065 | 0.79 | 1.348 | 1.054 | 6.21 | 6.22 |

Example 2

An HDPE powder resin, used to make AD60007 pellets, was tested for melt index according to ASTM-D1238 with a load of 2.16 kg. Plaques for testing were prepared according to ASTM-D4703. The oscillation dynamic rheology was conducted with a Rheometric Dynamic Analyzer III using 25 mm parallel plates, a temperature of 155° C., a strain of 10% and a frequency sweep from 1 to 100 radians per second. The data is shown in Table 2. Graph 2 shows the actual versus predicted die swell based on the data in Table 2. The partial least squares on analysis of the data in Table 2 provided the Equation 2:

Predicted Die Swell=1.24−(0.0362*Crossover point)−(0.0246*Crossover frequency)−(0.0204*Frequency of 1)+(7.01 *Frequency of 1.25)−(12.8*Frequency of 2.5)+(25.7*Frequency of 25)−(15.3*Frequency of 100)   Equation 2

TABLE 2

AD60007 Swell Model (Frequency Sweep)

| Batch | PDI | Crossover Point | Crossover Frequency | Frequency 1 | Frequency 1.58 | Frequency 2.5 | Frequency 3.98 | Frequency 6.31 |
|---|---|---|---|---|---|---|---|---|
| 1 | 1.9503 | 5.127 | 29.461 | 1.48816 | 1.41698 | 1.34539 | 1.27386 | 1.20713 |
| 2 | 1.9153 | 5.221 | 30.329 | 1.50128 | 1.42758 | 1.35388 | 1.2811 | 1.21272 |
| 3 | 1.9696 | 5.077 | 23.613 | 1.44307 | 1.37294 | 1.30415 | 1.23654 | 1.17181 |
| 4 | 1.9302 | 5.181 | 29.907 | 1.51154 | 1.43485 | 1.36108 | 1.28726 | 1.21671 |
| 5 | 1.9741 | 5.066 | 29.624 | 1.52107 | 1.43974 | 1.36327 | 1.28735 | 1.21683 |
| 6 | 1.8882 | 5.296 | 33.155 | 1.5403 | 1.45909 | 1.38148 | 1.30603 | 1.234 |
| 7 | 2.0901 | 4.785 | 29.856 | 1.50703 | 1.43064 | 1.3565 | 1.28313 | 1.21382 |
| 8 | 1.9229 | 5.201 | 31.75 | 1.5193 | 1.3678 | 1.29425 | 1.22392 | |
| 9 | 2.1292 | 4.697 | 31.765 | 1.53253 | 1.45322 | 1.37666 | 1.30174 | 1.22817 |
| 10 | 2.0553 | 4.866 | 33.954 | 1.54649 | 1.46963 | 1.38981 | 1.31324 | 1.23995 |
| 11 | 2.2669 | 4.411 | 26.532 | 1.46763 | 1.39509 | 1.32348 | 1.25437 | 1.18827 |
| 12 | 1.9652 | 5.089 | 34.183 | 1.53649 | 1.45885 | 1.38163 | 1.30768 | 1.23635 |
| 13 | 2.2091 | 4.527 | 25.202 | 1.45063 | 1.38221 | 1.31217 | 1.24469 | 1.17945 |
| 14 | 2.0567 | 4.862 | 30.789 | 1.5024 | 1.42726 | 1.35581 | 1.28345 | 1.21507 |
| 15 | 2.0313 | 4.923 | 26.91 | 1.47119 | 1.39815 | 1.3278 | 1.25887 | 1.19231 |
| 16 | 1.9541 | 5.117 | 26.558 | 1.45899 | 1.39369 | 1.32332 | 1.25514 | 1.18947 |
| 17 | 2.1552 | 4.64 | 28.01 | 1.47498 | 1.4064 | 1.33557 | 1.26542 | 1.19851 |
| 18 | 2.0611 | 4.852 | 24.158 | 1.43903 | 1.37124 | 1.30324 | 1.23705 | 1.17339 |
| 19 | 2.2147 | 4.515 | 21.837 | 1.42131 | 1.35292 | 1.28494 | 1.22011 | 1.15733 |
| 20 | 2.1925 | 4.561 | 26.58 | 1.46747 | 1.39696 | 1.32656 | 1.2576 | 1.19063 |
| 21 | 2.312 | 4.325 | 26.223 | 1.43186 | 1.36737 | 1.30242 | 1.23736 | 1.17617 |
| 22 | 2.0336 | 4.917 | 24.069 | 1.43927 | 1.36941 | 1.30291 | 1.23633 | 1.17198 |
| 23 | 1.8847 | 5.306 | 30.618 | 4.50504 | 1.42779 | 1.35218 | 1.28196 | 1.21361 |
| 24 | 1.9629 | 5.094 | 28.405 | 1.48964 | 1.41617 | 1.3411 | 1.26947 | 1.20181 |
| 25 | 1.9617 | 5.098 | 25.909 | 1.47065 | 1.39835 | 1.32468 | 1.25437 | 1.18724 |
| 26 | 1.9696 | 5.077 | 27.098 | 1.47184 | 1.40154 | 1.32875 | 1.25877 | 1.19184 |
| 27 | 1.9206 | 5.207 | 29.692 | 1.49989 | 1.42572 | 1.35143 | 1.27935 | 1.21056 |
| 28 | 1.8205 | 5.493 | 33.957 | 1.54583 | 1.46456 | 1.38466 | 1.30781 | 1.23523 |
| 29 | 1.906 | 5.247 | 34.748 | 1.52925 | 1.4541 | 1.37665 | 1.30353 | 1.23362 |
| 30 | 1.9282 | 5.186 | 27.057 | 1.46408 | 1.39044 | 1.31746 | 1.24866 | 1.18193 |
| 31 | 1.9891 | 5.027 | 28.243 | 1.47282 | 1.40295 | 1.33181 | 1.26248 | 1.19631 |
| 32 | 1.9903 | 5.024 | 26.972 | 1.47975 | 1.40453 | 1.33099 | 1.26053 | 1.19272 |
| 33 | 1.8422 | 5.428 | 30.663 | 1.53361 | 1.4549 | 1.37417 | 1.29697 | 1.22441 |
| 34 | 1.9733 | 5.068 | 27.146 | 1.49742 | 1.42125 | 1.34413 | 1.27193 | 1.20118 |
| 35 | 2.1439 | 4.664 | 26.148 | 1.46637 | 1.39452 | 1.32114 | 1.25256 | 1.18582 |
| 36 | 1.8159 | 5.507 | 29.192 | 1.51684 | 1.43994 | 1.36142 | 1.28658 | 1.2152 |
| 37 | 2.1812 | 4.585 | 25.683 | 1.44733 | 1.37919 | 1.31097 | 1.24384 | 1.17918 |
| 38 | 1.908 | 5.241 | 31.794 | 1.52285 | 1.44502 | 1.36761 | 1.29351 | 1.22296 |
| 39 | 2.0531 | 4.871 | 29.897 | 1.50699 | 1.4326 | 1.35412 | 1.28 | 1.21064 |
| 40 | 2.3143 | 4.321 | 23.234 | 1.42616 | 1.35926 | 1.29117 | 1.22577 | 1.16284 |
| 41 | 2.182 | 4.583 | 26.647 | 1.47124 | 1.40039 | 1.32696 | 1.25626 | 1.18929 |
| 42 | 2.0529 | 4.871 | 32.103 | 1.51485 | 1.43865 | 1.36191 | 1.28983 | 1.22034 |
| 43 | 1.9338 | 5.171 | 26.569 | 1.458 | 1.38821 | 1.31704 | 1.24879 | 1.18418 |
| 44 | 1.8848 | 5.305 | 28.241 | 1.47852 | 1.40642 | 1.3345 | 1.26438 | 1.1977 |
| 45 | 1.9799 | 5.051 | 31.725 | 1.50307 | 1.43163 | 1.35745 | 1.28635 | 1.21778 |
| 46 | 1.942 | 5.149 | 27.893 | 1.46744 | 1.3978 | 1.32649 | 1.25801 | 1.19265 |
| 47 | 1.9591 | 5.104 | 28.768 | 1.48796 | 1.41231 | 1.33945 | 1.26894 | 1.20155 |
| 48 | 1.9751 | 5.063 | 26.047 | 1.45911 | 1.38966 | 1.31875 | 1.25014 | 1.18473 |
| 49 | 2.1275 | 4.7 | 24.666 | 1.43061 | 1.36457 | 1.29794 | 1.23263 | 1.17032 |
| 50 | 1.9534 | 5.119 | 26.841 | 1.46001 | 1.38913 | 1.31839 | 1.2505 | 1.18599 |
| 51 | 2.0557 | 4.864 | 27.227 | 1.46172 | 1.39167 | 1.32096 | 1.25413 | 1.18854 |
| 52 | 2.498 | 4.879 | 25.226 | 1.45441 | 1.3825 | 1.31234 | 1.24379 | 1.17835 |
| 53 | 2.1075 | 4.745 | 25.036 | 1.43762 | 1.37101 | 1.30242 | 1.23591 | 1.17294 |
| 54 | 1.9701 | 5.076 | 26.967 | 1.46979 | 1.39973 | 1.3274 | 1.25815 | 1.19188 |
| 55 | 1.8977 | 5.27 | 28.964 | 1.49337 | 1.41944 | 1.3465 | 1.27504 | 1.20601 |
| 56 | 1.9857 | 5.036 | 30 | 1.4804 | 1.41058 | 1.3397 | 1.27043 | 1.20273 |
| 57 | 1.9739 | 5.066 | 28.218 | 1.49911 | 1.4223 | 1.34757 | 1.27504 | 1.20544 |
| 58 | 1.9614 | 5.098 | 29.274 | 1.49861 | 1.42432 | 1.35127 | 1.27916 | 1.2101 |
| 59 | 1.98 | 5.05 | 28.348 | 1.49047 | 1.41697 | 1.34362 | 1.2711 | 1.20324 |
| 60 | 1.18137 | 5.514 | 31.876 | 1.53809 | 1.4605 | 1.37981 | 1.30448 | 1.23134 |
| 61 | 1.8593 | 5.378 | 30.19 | 1.54357 | 1.46273 | 1.37994 | 1.30156 | 1.22667 |
| 62 | 1.8017 | 5.55 | 32.612 | 1.56188 | 1.47739 | 1.39631 | 1.31703 | 1.24178 |
| 63 | 1.4038 | 5.544 | 34.697 | 1.57114 | 1.48775 | 1.40534 | 1.32504 | 1.24989 |
| 64 | 1.9289 | 5.184 | 30.366 | 1.51793 | 1.44128 | 1.36427 | 1.2898 | 1.21869 |
| 65 | 1.9767 | 5.059 | 23.245 | 1.43788 | 1.3712 | 1.3015 | 1.23448 | 1.17018 |
| 66 | 1.7669 | 5.66 | 31.667 | 1.54644 | 1.46416 | 1.38446 | 1.30743 | 1.23319 |
| 67 | 2.0193 | 4.952 | 27.173 | 1.47038 | 1.39856 | 1.329 | 1.2587 | 1.19284 |

TABLE 2-continued

AD60007 Swell Model (Frequency Sweep)

| | | | | | | | | |
|---|---|---|---|---|---|---|---|---|
| 68 | 1.7934 | 5.576 | 28.354 | 1.50787 | 1.43471 | 1.35696 | 1.28292 | 1.21195 |
| 69 | 1.7 | 5.882 | 31.595 | 1.55654 | 1.47613 | 1.39448 | 1.31472 | 1.23897 |
| 70 | 1.5716 | 6.363 | 33.553 | 1.58769 | 1.5021 | 1.41821 | 1.33493 | 1.25664 |
| 71 | 2.0525 | 4.872 | 28.327 | 1.4744 | 1.40362 | 1.33214 | 1.26288 | 1.1962 |
| 72 | 1.9621 | 5.097 | 30.543 | 1.51284 | 1.43842 | 1.36134 | 1.28747 | 1.21774 |
| 73 | 2.0157 | 4.961 | 27.501 | 1.48275 | 1.40996 | 1.33648 | 1.2644 | 1.19717 |
| 74 | 2.1457 | 4.66 | 25.792 | 1.46007 | 1.38727 | 1.3158 | 1.24862 | 1.18269 |
| 75 | 2.2833 | 4.38 | 25.63 | 1.48211 | 1.40478 | 1.32969 | 1.25804 | 1.18912 |
| 76 | 2.167 | 4.615 | 24.132 | 1.44768 | 1.37801 | 1.30684 | 1.23844 | 1.17387 |
| 77 | 1.9582 | 5.107 | 23.772 | 1.45246 | 1.38315 | 1.31004 | 1.24184 | 1.17458 |
| 78 | 1.9374 | 5.161 | 25.184 | 1.47159 | 1.39461 | 1.32193 | 1.25142 | 1.18417 |
| 79 | 2.0375 | 4.908 | 24.209 | 1.45596 | 1.38499 | 1.31314 | 1.24327 | 1.1771 |
| 80 | 2.1168 | 4.724 | 22.786 | 1.43212 | 1.36213 | 1.29357 | 1.22666 | 1.16355 |
| 81 | 1.988 | 5.03 | 25.808 | 1.47128 | 1.40038 | 1.32564 | 1.25535 | 1.18752 |
| 82 | 2.157 | 4.636 | 22.789 | 1.41596 | 1.35095 | 1.28497 | 1.22042 | 1.15904 |
| 83 | 1.8133 | 5.515 | 30.013 | 1.52175 | 1.44506 | 1.36751 | 1.2919 | 1.22066 |
| 84 | 2.1557 | 4.639 | 21.287 | 1.41256 | 1.34596 | 1.27927 | 1.21429 | 1.15184 |
| 85 | 2.1194 | 4.718 | 26.381 | 1.47217 | 1.39907 | 1.3273 | 1.25782 | 1.19084 |
| 86 | 2.225 | 4.494 | 22.309 | 1.44145 | 1.37045 | 1.30075 | 1.23024 | 1.16542 |
| 87 | 2.0713 | 4.828 | 25.394 | 1.46355 | 1.39349 | 1.32151 | 1.25317 | 1.18585 |

| Batch | Frequency 10 | Frequency 15.8 | Frequency 25 | Frequency 39.8 | Frequency 63.09 | Frequency 100 | ODR Prediction | Uniloy Swell |
|---|---|---|---|---|---|---|---|---|
| 1 | 1.1425 | 1.08078 | 1.02028 | 0.96282 | 0.90814 | 0.85487 | 6.18 | 6.16 |
| 2 | 1.14747 | 1.0851 | 1.02408 | 0.9662 | 0.91088 | 0.85746 | 6.18 | 6.18 |
| 3 | 1.11006 | 1.05055 | 0.99243 | 0.93751 | 0.88061 | 0.83336 | 6.16 | 6.17 |
| 4 | 1.14936 | 1.0853 | 1.02284 | 0.96364 | 0.9074 | 0.85349 | 6.18 | 6.21 |
| 5 | 1.14907 | 1.08437 | 1.02166 | 0.96232 | 0.90591 | 0.85177 | 6.19 | 6.21 |
| 6 | 1.16516 | 1.10017 | 1.03662 | 0.9766 | 0.91966 | 0.86483 | 6.18 | 6.2 |
| 7 | 1.14741 | 1.08402 | 1.02232 | 0.96387 | 0.90817 | 0.85451 | 6.19 | 6.2 |
| 8 | 1.15695 | 1.09293 | 1.03059 | 0.97129 | 0.91506 | 0.86079 | 6.19 | 6.22 |
| 9 | 1.1596 | 1.09449 | 1.03105 | 0.97102 | 0.91408 | 0.85936 | 6.20 | 6.21 |
| 10 | 1.17065 | 1.10445 | 1.04014 | 0.97944 | 0.92186 | 0.86652 | 6.21 | 6.19 |
| 11 | 1.12496 | 1.06526 | 1.00679 | 0.95115 | 0.89856 | 0.84746 | 6.17 | 6.18 |
| 12 | 1.16812 | 1.10361 | 1.04032 | 0.98067 | 0.92399 | 0.86915 | 6.19 | 6.18 |
| 13 | 1.1173 | 1.05837 | 1.00041 | 0.94548 | 0.89299 | 0.84219 | 6.17 | 6.14 |
| 14 | 1.14959 | 1.0872 | 1.02608 | 0.96809 | 0.91282 | 0.85947 | 6.17 | 6.17 |
| 15 | 1.12925 | 1.06835 | 1.00868 | 0.95213 | 0.89818 | 0.84611 | 6.18 | 6.19 |
| 16 | 1.12667 | 1.0661 | 1.00696 | 0.95072 | 0.89642 | 0.84444 | 6.19 | 6.19 |
| 17 | 1.13467 | 1.07363 | 1.01376 | 0.95685 | 0.9025 | 0.85022 | 6.19 | 6.17 |
| 18 | 1.1121 | 1.05311 | 0.9952 | 0.94025 | 0.88729 | 0.8361 | 6.18 | 6.18 |
| 19 | 1.09741 | 1.03945 | 0.98311 | 0.92933 | 0.87777 | 0.82777 | 6.17 | 6.17 |
| 20 | 1.12696 | 1.06641 | 1.00711 | 0.95067 | 0.89706 | 0.84536 | 6.18 | 6.18 |
| 21 | 1.1173 | 1.06066 | 1.00508 | 0.9519 | 0.90062 | 0.85073 | 6.16 | 6.17 |
| 22 | 1.11089 | 1.05229 | 0.99479 | 0.94055 | 0.88815 | 0.83767 | 6.14 | 6.13 |
| 23 | 1.14811 | 1.08595 | 1.02521 | 0.96752 | 0.91271 | 0.85994 | 6.12 | 6.12 |
| 24 | 1.13633 | 1.07525 | 1.01542 | 0.95902 | 0.90533 | 0.85381 | 6.15 | 6.15 |
| 25 | 1.12354 | 1.06287 | 1.00384 | 0.94839 | 0.89514 | 0.84397 | 6.15 | 6.16 |
| 26 | 1.12899 | 1.06835 | 1.00943 | 0.95356 | 0.90044 | 0.84909 | 6.15 | 6.15 |
| 27 | 1.14506 | 1.08249 | 1.02137 | 0.96372 | 0.90903 | 0.85614 | 6.16 | 6.17 |
| 28 | 1.16669 | 1.10193 | 1.03917 | 0.97993 | 0.92363 | 0.86984 | 6.14 | 6.14 |
| 29 | 1.16684 | 1.10333 | 1.04159 | 0.98301 | 0.92703 | 0.87361 | 6.16 | 6.18 |
| 30 | 1.11955 | 1.06017 | 1.00914 | 0.9478 | 0.89554 | 0.85424 | 6.13 | 6.14 |
| 31 | 1.13311 | 1.07322 | 1.0145 | 0.95868 | 0.90524 | 0.85386 | 6.15 | 6.17 |
| 32 | 1.12868 | 1.06798 | 1.00884 | 0.95326 | 0.90046 | 0.84932 | 6.13 | 6.13 |
| 33 | 1.1553 | 1.08979 | 1.02623 | 0.96673 | 0.90998 | 0.85594 | 6.17 | 6.17 |
| 34 | 1.1349 | 1.07147 | 1.01003 | 0.952004 | 0.89706 | 0.84441 | 6.18 | 6.17 |
| 35 | 1.12273 | 1.06297 | 1.00491 | 0.95013 | 0.89784 | 0.8476 | 6.15 | 6.16 |
| 36 | 1.14734 | 1.08278 | 1.01969 | 0.96064 | 0.90412 | 0.8503 | 6.18 | 6.19 |
| 37 | 1.11803 | 1.05968 | 1.00268 | 0.94872 | 0.89706 | 0.84713 | 6.13 | 6.15 |
| 38 | 1.15569 | 1.0919 | 1.03025 | 0.97197 | 0.91656 | 0.86324 | 6.16 | 6.16 |
| 39 | 1.14432 | 1.0821 | 1.02182 | 0.9652 | 0.91118 | 0.85956 | 6.14 | 6.13 |
| 40 | 1.10295 | 1.04602 | 0.99079 | 0.93796 | 0.88781 | 0.83916 | 6.13 | 6.14 |
| 41 | 1.12573 | 1.06559 | 1.00727 | 0.95195 | 0.89926 | 0.84867 | 6.15 | 6.11 |
| 42 | 1.15423 | 1.09161 | 1.03102 | 0.97353 | 0.91879 | 0.86614 | 6.17 | 6.16 |
| 43 | 1.12252 | 1.06393 | 1.00674 | 0.95303 | 0.90163 | 0.85194 | 6.11 | 6.12 |
| 44 | 1.13415 | 1.0733 | 1.01445 | 0.95883 | 0.90563 | 0.85444 | 6.12 | 6.13 |
| 45 | 1.15225 | 1.09029 | 1.02945 | 0.97227 | 0.91785 | 0.86537 | 6.15 | 6.13 |
| 46 | 1.13058 | 1.0709 | 1.01278 | 0.95783 | 0.90519 | 0.85428 | 6.14 | 6.12 |
| 47 | 1.13766 | 1.07645 | 1.01694 | 0.96063 | 0.90715 | 0.85553 | 6.14 | 6.11 |
| 48 | 1.12214 | 1.0627 | 1.00445 | 0.94971 | 0.89721 | 0.84671 | 6.13 | 6.14 |
| 49 | 1.11048 | 1.05359 | 0.99784 | 0.94467 | 0.89388 | 0.84448 | 6.14 | 6.11 |
| 50 | 1.12449 | 1.06558 | 1.00804 | 0.9536 | 0.90141 | 0.85082 | 6.14 | 6.14 |
| 51 | 1.1263 | 1.06718 | 1.00974 | 0.95548 | 0.90376 | 0.85386 | 6.12 | 6.11 |
| 52 | 1.11668 | 1.05777 | 1.00051 | 0.94636 | 0.89502 | 0.84562 | 6.11 | 6.11 |
| 53 | 1.11286 | 1.05542 | 0.99961 | 0.9465 | 0.89585 | 0.84697 | 6.12 | 6.11 |

TABLE 2-continued

AD60007 Swell Model (Frequency Sweep)

| | | | | | | | | |
|---|---|---|---|---|---|---|---|---|
| 54 | 1.12872 | 1.06784 | 1.0088 | 0.95308 | 0.89953 | 0.84836 | 6.16 | 6.15 |
| 55 | 1.14084 | 1.07849 | 1.01798 | 0.96096 | 0.90621 | 0.85402 | 6.14 | 6.14 |
| 56 | 1.13887 | 1.07811 | 1.01858 | 0.97078 | 0.90837 | 0.85689 | 6.12 | 6.12 |
| 57 | 1.13959 | 1.07613 | 1.01495 | 0.95698 | 0.90187 | 0.84897 | 6.17 | 6.16 |
| 58 | 1.14416 | 1.08123 | 1.01978 | 0.96143 | 0.90614 | 0.85285 | 6.18 | 6.17 |
| 59 | 1.13839 | 1.0761 | 1.01541 | 0.95804 | 0.90359 | 0.85102 | 6.16 | 6.14 |
| 60 | 1.16222 | 1.09596 | 1.03182 | 0.97112 | 0.91326 | 0.85785 | 6.22 | 6.24 |
| 61 | 1.15642 | 1.08937 | 1.02476 | 0.96386 | 0.90603 | 0.85067 | 6.21 | 6.24 |
| 62 | 1.16986 | 1.10186 | 1.03571 | 0.97356 | 0.91453 | 0.85825 | 6.20 | 6.19 |
| 63 | 1.17803 | 1.10983 | 1.04381 | 0.98121 | 0.91746 | 0.86567 | 6.20 | 6.19 |
| 64 | 1.15071 | 1.08704 | 1.02468 | 0.96591 | 0.91023 | 0.85665 | 6.17 | 6.17 |
| 65 | 1.10842 | 1.0488 | 0.99034 | 0.93493 | 0.88162 | 0.83025 | 6.18 | 6.18 |
| 66 | 1.16294 | 1.09597 | 1.03105 | 0.97021 | 0.91207 | 0.85692 | 6.18 | 6.19 |
| 67 | 1.12982 | 1.06934 | 1.00986 | 0.95347 | 0.89939 | 0.84723 | 6.17 | 6.19 |
| 68 | 1.14422 | 1.07952 | 1.01604 | 0.95644 | 0.89912 | 0.84452 | 6.21 | 6.21 |
| 69 | 1.16714 | 1.09858 | 1.03165 | 0.96909 | 0.90921 | 0.8522 | 6.22 | 6.22 |
| 70 | 1.18171 | 1.11042 | 1.0413 | 0.97631 | 0.91434 | 0.85503 | 6.23 | 6.19 |
| 71 | 1.13316 | 1.07323 | 1.01471 | 0.95958 | 0.90672 | 0.85583 | 6.13 | 6.17 |
| 72 | 1.15062 | 1.08714 | 1.0253 | 0.96674 | 0.91122 | 0.85791 | 6.18 | 6.16 |
| 73 | 1.13253 | 1.07122 | 1.01144 | 0.95459 | 0.90047 | 0.8485 | 6.17 | 6.17 |
| 74 | 1.12017 | 1.06115 | 1.00325 | 0.94831 | 0.89575 | 0.84525 | 6.17 | 6.17 |
| 75 | 1.12374 | 1.0621 | 1.00254 | 0.94599 | 0.89238 | 0.84086 | 6.17 | 6.18 |
| 76 | 1.11137 | 1.05252 | 0.99511 | 0.94073 | 0.88852 | 0.83832 | 6.16 | 6.14 |
| 77 | 1.1118 | 1.05156 | 0.99319 | 0.93825 | 0.88545 | 0.83448 | 6.15 | 6.16 |
| 78 | 1.11988 | 1.0594 | 1.00033 | 0.94456 | 0.89141 | 0.83995 | 6.14 | 6.14 |
| 79 | 1.11395 | 1.05393 | 0.99543 | 0.9404 | 0.88747 | 0.8368 | 6.14 | 6.13 |
| 80 | 1.10322 | 1.04493 | 0.98821 | 0.9345 | 0.88298 | 0.83327 | 6.14 | 6.15 |
| 81 | 1.12373 | 1.06274 | 1.00339 | 0.94732 | 0.89379 | 0.84225 | 6.17 | 6.19 |
| 82 | 1.10033 | 1.04382 | 0.98851 | 0.93596 | 0.88514 | 0.8361 | 6.14 | 6.16 |
| 83 | 1.15214 | 1.08686 | 1.02351 | 0.96379 | 0.90678 | 0.8521 | 6.19 | 6.2 |
| 84 | 1.0925 | 1.03588 | 0.98029 | 0.92773 | 0.87678 | 0.82782 | 6.13 | 6.16 |
| 85 | 1.12664 | 1.06567 | 1.00617 | 0.94967 | 0.8956 | 0.84326 | 6.19 | 6.17 |
| 86 | 1.10249 | 1.04319 | 0.98535 | 0.93089 | 0.87882 | 0.82861 | 6.13 | 6.14 |
| 87 | 1.12203 | 1.06108 | 1.00137 | 0.94522 | 0.89085 | 0.83861 | 6.19 | 6.21 |

Example 3

A HIC grade HDPE resin, sold by ExxonMobil Chemical Company under the designation AG45004, AA45004 and AS55003, was tested for melt index according to ASTM-D1238 with a load of 2.16 kg. Plaques for testing were prepared according to ASTM-D4703. The oscillation dynamic rheology was conducted with a Rheometric Dynamic Analyzer III using 25 mm parallel plates, a temperature sweep from 145° C. to 155° C. at 4° C./minute, a strain of 10% and a frequency of 12.588 radians per second. The data is shown in Table 3. Graph 3 show the correlation of measured Uniloy die swell values versus predicted die swell (ODR predicted) values based on Equation 3. The partial least squares on analysis of the data in Table 3 provided the Equation 3:

Predicted die swell=6.34−(24.5*tan (delta) at 155° C.)+(1.55*melt index)+(0.0278*tan (delta) at 155° C./melt index)+(23.7*tan (delta) at 145° C.)     Equation 3

TABLE 3

HIC Swell Model

| Batch | tan155 | MI | tan155/MI | tan145 | ODR Prediction | Uniloy Swell |
|---|---|---|---|---|---|---|
| 1 | 0.9011 | 0.34 | 2.650294 | 0.891 | 5.98 | 6.01 |
| 2 | 0.9232 | 0.38 | 2.429474 | 0.9128 | 6.01 | 6.03 |
| 3 | 0.9242 | 0.37 | 2.497838 | 0.9144 | 6.01 | 6.01 |
| 4 | 0.9166 | 0.37 | 2.477297 | 0.9061 | 6.00 | 6.04 |
| 5 | 0.9278 | 0.41 | 2.262927 | 0.9175 | 6.05 | 6.05 |
| 6 | 0.9184 | 0.4 | 2.296 | 0.9078 | 6.04 | 6.05 |
| 7 | 0.9162 | 0.38 | 2.411053 | 0.9061 | 6.02 | 6.03 |
| 8 | 0.865 | 0.27 | 3.203704 | 0.8553 | 5.93 | 5.94 |

TABLE 3-continued

HIC Swell Model

| Batch | tan155 | MI | tan155/MI | tan145 | ODR Prediction | Uniloy Swell |
|---|---|---|---|---|---|---|
| 9 | 0.8794 | 0.27 | 3.257037 | 0.8696 | 5.91 | 5.91 |
| 10 | 0.8627 | 0.24 | 3.594583 | 0.8531 | 5.89 | 5.91 |
| 11 | 0.9039 | 0.36 | 2.510833 | 0.8932 | 5.99 | 6 |
| 12 | 0.8855 | 0.3 | 2.951667 | 0.8753 | 5.94 | 5.94 |
| 13 | 0.8949 | 0.3 | 2.983 | 0.8846 | 5.93 | 5.93 |
| 14 | 0.8798 | 0.28 | 3.142143 | 0.8697 | 5.92 | 5.95 |
| 15 | 0.8801 | 0.3 | 2.933667 | 0.8695 | 5.93 | 5.92 |

Example 4

An HDPE resin, sold by ExxonMobil Chemical Company under the designation AD60005, was tested for tan (delta) at 155° C. Plaques for testing were prepared according to ASTM-D4703. The oscillation dynamic rheology was conducted with a Rheometric Dynamic Analyzer III using 25-mm parallel plates, a temperature sweep from 145° C. to 155° C. at 4° C./minute, a strain of 10% and a frequency of 12.588 radians per second. The data is shown in Table 4. Graph 4 shows the correlation of measured Uniloy die swell values versus predicted die swell ODR predicted) values based on Equation 4. The partial least squares ion analysis of the data in Table 4 provided the Equation 4:

Predicted die swell=4.7881+(1.365*tan (delta) at 155° C.)     Equation 4

TABLE 4

AD60005 Swell Model

| Batch | TAN155 | ODR Prediction | Uniloy Swell |
|---|---|---|---|
| 1 | 0.95456 | 6.09 | 6.09 |
| 2 | 0.96683 | 6.11 | 6.12 |
| 3 | 0.97584 | 6.12 | 6.11 |
| 4 | 0.98389 | 6.13 | 6.14 |
| 5 | 0.99386 | 6.14 | 6.15 |
| 6 | 0.9566 | 6.09 | 6.12 |
| 7 | 0.95459 | 6.09 | 6.11 |
| 8 | 0.97091 | 6.11 | 6.12 |
| 9 | 0.9689 | 6.11 | 6.12 |
| 10 | 0.98129 | 6.13 | 6.14 |
| 11 | 1.009 | 6.17 | 6.17 |
| 12 | 0.97719 | 6.12 | 6.14 |
| 13 | 1.04109 | 6.21 | 6.2 |
| 14 | 1.04789 | 6.22 | 6.21 |
| 15 | 1.03739 | 6.20 | 6.21 |
| 16 | 1.04897 | 6.22 | 6.21 |
| 17 | 0.93713 | 6.07 | 6.05 |
| 18 | 0.9439 | 6.08 | 6.06 |
| 19 | 0.94628 | 6.08 | 6.07 |
| 20 | 0.95059 | 6.09 | 6.08 |
| 21 | 0.9612 | 6.10 | 6.1 |
| 22 | 0.95649 | 6.09 | 6.09 |

Example 5

An HDPE, sold by ExxonMobil Chemical Company under the designation AD60007, was tested for tan (delta) at 155° C. and melt index. The plaques for testing were prepared according to ASTM-D4703. Melt index testing was conducted according to ASTM-D1238 with a load of 2.16 kg. The oscillation dynamic rheology (ODR) was conducted with a Rheometric Dynamic Analyzer III using 25 mm parallel plates, a temperature of 155° C., with a strain of 10% and a frequency sweep from 1 to 100 radians per second. The data is listed in Table 5. Graph 5 shows correlation between the actual die swell measured on articles made on a Uniloy blow molding apparatus versus the predicted die swell based on Equation 5. The partial least squares regression analysis of the data in Table 5 provided the Equation 5:

Predicted die swell=24.7+(0.125*Crossover frequency)−(2.32*Frequency of 2.5)−(0.231*Frequency of 6.31)−(15*Frequency of 25)−(3.93*Frequency of 100)   Equation 5

TABLE 5

AD60007 Swell Model (Frequency Sweep)

| Batch | PDI | Crossover Point | Crossover Frequency | Frequency 1 | Frequency 1.58 | Frequency 2.5 | Frequency 3.98 | Frequency 6.31 |
|---|---|---|---|---|---|---|---|---|
| 1 | 2.1832 | 4.58 | 25.732 | 1.3919 | 1.33166 | 1.27598 | 1.22055 | 1.16459 |
| 2 | 2.2637 | 4.418 | 24.799 | 1.38077 | 1.32261 | 1.2681 | 1.21303 | 1.15821 |
| 3 | 2.2925 | 4.362 | 23.895 | 1.37869 | 1.32113 | 1.26486 | 1.20891 | 1.15447 |
| 4 | 2.2742 | 4.397 | 24.869 | 1.375 | 1.32089 | 1.26474 | 1.21059 | 1.15691 |
| 5 | 2.0752 | 4.819 | 24.636 | 1.37673 | 1.32223 | 1.26683 | 1.21153 | 1.15684 |
| 6 | 2.1454 | 4.661 | 24.054 | 1.37289 | 1.31828 | 1.26363 | 1.20712 | 1.15315 |
| 7 | 2.1771 | 4.593 | 23.006 | 1.36085 | 1.30791 | 1.25335 | 1.199 | 1.14548 |
| 8 | 2.1163 | 4.725 | 26.371 | 1.39941 | 1.34166 | 1.28324 | 1.22628 | 1.1695 |
| 9 | 2.2752 | 4.395 | 26.258 | 1.392 | 1.3358 | 1.2786 | 1.2226 | 1.16636 |
| 10 | 2.3219 | 4.307 | 24.032 | 1.38447 | 1.32511 | 1.26846 | 1.21205 | 1.15653 |
| 11 | 2.2173 | 4.51 | 25.594 | 1.39221 | 1.33093 | 1.27337 | 1.2169 | 1.16174 |
| 12 | 2.1743 | 4.599 | 24.748 | 1.3795 | 1.32308 | 1.26686 | 1.21144 | 1.15552 |
| 13 | 2.1847 | 4.577 | 21.15 | 1.36087 | 1.30575 | 1.24825 | 1.19229 | 1.13728 |
| 14 | 2.2486 | 4.447 | 19.357 | 1.33335 | 1.28099 | 1.22658 | 1.17485 | 1.12219 |
| 15 | 2.2915 | 4.364 | 19.443 | 1.32894 | 1.27946 | 1.2264 | 1.17392 | 1.12236 |
| 16 | 2.2099 | 4.525 | 19.19 | 1.33101 | 1.28009 | 1.22664 | 1.17267 | 1.12118 |
| 17 | 2.1821 | 4.583 | 19.856 | 1.35197 | 1.2959 | 1.2393 | 1.18391 | 1.129 |
| 18 | 2.2147 | 4.515 | 20.107 | 1.35178 | 1.29371 | 1.23903 | 1.18415 | 1.12997 |
| 19 | 2.2843 | 4.378 | 20.189 | 1.33829 | 1.28685 | 1.23228 | 1.17928 | 1.2664 |
| 20 | 2.1414 | 4.67 | 19.699 | 1.34716 | 1.29036 | 1.2347 | 1.18021 | 1.12722 |
| 21 | 2.2331 | 4.478 | 19.057 | 1.32671 | 1.27609 | 1.22333 | 1.17019 | 1.11924 |
| 22 | 2.277 | 4.392 | 17.612 | 1.31267 | 1.26329 | 1.21164 | 1.15952 | 1.10887 |
| 23 | 2.1999 | 4.546 | 20.196 | 1.34856 | 1.29614 | 1.24218 | 1.18704 | 1.13281 |
| 24 | 2.1422 | 4.668 | 20.98 | 1.35426 | 1.3028 | 1.24857 | 1.19344 | 1.13884 |
| 25 | 1.9925 | 5.019 | 23.246 | 1.38251 | 1.32834 | 1.27204 | 1.21404 | 1.15708 |
| 26 | 2.1699 | 4.609 | 20.964 | 1.35435 | 1.30268 | 1.24758 | 1.19313 | 1.13854 |
| 27 | 2.284 | 4.378 | 23.232 | 1.3827 | 1.32547 | 1.26818 | 1.21008 | 1.15378 |
| 28 | 2.2973 | 4.353 | 20.541 | 1.34528 | 1.29486 | 1.24043 | 1.18683 | 1.13305 |
| 29 | 2.1649 | 4.619 | 20.983 | 1.3548 | 1.30103 | 1.24629 | 1.19115 | 1.13744 |
| 30 | 2.184 | 4.579 | 22.153 | 1.36671 | 1.31326 | 1.2581 | 1.20062 | 1.1462 |
| 31 | 2.1927 | 4.561 | 20.49 | 1.3489 | 1.29536 | 1.24094 | 1.18654 | 1.3301 |
| 32 | 2.299 | 4.35 | 20.555 | 1.34273 | 1.29057 | 1.23672 | 1.18277 | 1.13071 |
| 33 | 2.2942 | 4.359 | 20.415 | 1.34014 | 1.28886 | 1.23553 | 1.18102 | 1.12899 |
| 34 | 2.194 | 4.558 | 20.918 | 1.35102 | 1.29839 | 1.24229 | 1.18688 | 1.13368 |
| 35 | 2.1831 | 4.581 | 21.324 | 1.34792 | 1.29592 | 1.24142 | 1.18757 | 1.13482 |
| 36 | 2.2583 | 4.428 | 20.034 | 1.33838 | 1.28615 | 1.23263 | 1.17934 | 1.12702 |
| 37 | 2.2888 | 4.369 | 19.962 | 1.33336 | 1.28232 | 1.22877 | 1.17694 | 1.1256 |
| 38 | 2.2248 | 4.495 | 20.393 | 1.34017 | 1.29033 | 1.23481 | 1.18219 | 1.13 |
| 39 | 2.248 | 4.448 | 18.98 | 1.3271 | 1.27653 | 1.22264 | 1.17053 | 1.11966 |
| 40 | 2.2909 | 4.356 | 19.554 | 1.32754 | 1.27791 | 1.22447 | 1.17232 | 1.12122 |

TABLE 5-continued

AD60007 Swell Model (Frequency Sweep)

| | | | | | | | | |
|---|---|---|---|---|---|---|---|---|
| 41 | 2.2013 | 4.543 | 19.802 | 1.33674 | 1.28528 | 1.23027 | 1.17769 | 1.12572 |
| 42 | 2.2474 | 4.45 | 21.21 | 1.35295 | 1.29815 | 1.24391 | 1.19006 | 1.13679 |
| 43 | 2.29 | 4.367 | 20.124 | 1.33555 | 1.2854 | 1.23095 | 1.17848 | 1.12737 |
| 44 | 1.8486 | 5.41 | 25.586 | 1.42559 | 1.36439 | 1.30184 | 1.23975 | 1.17897 |
| 45 | 1.9417 | 5.15 | 25.122 | 1.41076 | 1.35082 | 1.29 | 1.23054 | 1.1711 |
| 46 | 2.1231 | 4.71 | 24.008 | 1.3925 | 1.33573 | 1.27788 | 1.21959 | 1.16227 |
| 47 | 1.9308 | 5.179 | 24.552 | 1.40696 | 1.34821 | 1.28845 | 1.22856 | 1.16921 |
| 48 | 1.9793 | 5.052 | 26.381 | 1.43564 | 1.37391 | 1.3111 | 1.24763 | 1.1859 |
| 49 | 1.8475 | 5.413 | 24.784 | 1.41869 | 1.35684 | 1.29619 | 1.2346 | 1.174 |
| 50 | 1.8964 | 5.273 | 26.588 | 1.42046 | 1.36111 | 1.2999 | 1.23919 | 1.17972 |
| 51 | 2.1356 | 4.683 | 21.357 | 1.36106 | 1.30498 | 1.24833 | 1.19275 | 1.13847 |
| 52 | 2.2856 | 4.375 | 22.651 | 1.36924 | 1.31297 | 1.25585 | 1.20001 | 1.14503 |
| 53 | 2.2936 | 4.36 | 22.952 | 1.37713 | 1.3189 | 1.2612 | 1.20385 | 1.14839 |
| 54 | 2.2401 | 4.464 | 18.934 | 1.32912 | 1.27772 | 1.22416 | 1.17148 | 1.11966 |
| 55 | 2.1544 | 4.642 | 22.304 | 1.37087 | 1.31496 | 1.25825 | 1.20154 | 1.14639 |
| 56 | 2.1246 | 4.707 | 23.416 | 1.38465 | 1.32655 | 1.26744 | 1.21022 | 1.1538 |
| 57 | 2.2479 | 4.449 | 20.392 | 1.35572 | 1.3002 | 1.24319 | 1.18728 | 1.13338 |
| 58 | 2.2331 | 4.478 | 19.868 | 1.35175 | 1.29625 | 1.24032 | 1.18424 | 1.12988 |
| 59 | 2.1749 | 4.598 | 20.841 | 1.36029 | 1.30372 | 1.24694 | 1.19086 | 1.13624 |
| 60 | 2.2098 | 4.525 | 21.558 | 1.36912 | 1.31132 | 1.25497 | 1.19759 | 1.14216 |
| 61 | 2.2468 | 4.451 | 20.409 | 1.35547 | 1.30019 | 1.24402 | 1.18845 | 1.13381 |
| 62 | 2.1908 | 4.564 | 19.103 | 1.34586 | 1.29063 | 1.23478 | 1.17962 | 1.12499 |
| 63 | 2.1398 | 4.673 | 22.056 | 1.37302 | 1.31522 | 1.25769 | 1.20108 | 1.14513 |
| 64 | 2.2701 | 4.405 | 21.656 | 1.3623 | 1.30904 | 1.25165 | 1.19508 | 1.14092 |
| 65 | 2.219 | 4.507 | 21.665 | 1.37288 | 1.31423 | 1.25656 | 1.19903 | 1.14383 |
| 66 | 2.1379 | 4.677 | 19.673 | 1.34326 | 1.28899 | 1.23352 | 1.17876 | 1.1264 |
| 67 | 2.2051 | 4.535 | 22.052 | 1.37511 | 1.31794 | 1.25951 | 1.20154 | 1.14615 |
| 68 | 2.0755 | 4.818 | 19.552 | 1.35213 | 1.29657 | 1.24142 | 1.18478 | 1.12982 |
| 69 | 2.0673 | 4.837 | 19.845 | 1.35767 | 1.30063 | 1.2436 | 1.18701 | 1.13236 |
| 70 | 2.0972 | 4.768 | 20.041 | 1.35639 | 1.30128 | 1.2445 | 1.18834 | 1.13313 |
| 71 | 2.2197 | 4.505 | 20.56 | 1.35668 | 1.30325 | 1.24716 | 1.1908 | 1.136 |
| 72 | 2.0715 | 4.828 | 19.316 | 1.35219 | 1.29523 | 1.23881 | 1.18288 | 1.12807 |
| 73 | 2.1305 | 4.694 | 21.631 | 1.36865 | 1.31283 | 1.25491 | 1.19916 | 1.1431 |
| 74 | 2.1623 | 4.625 | 20.516 | 1.36013 | 1.30346 | 1.24698 | 1.19038 | 1.13626 |
| 75 | 2.0154 | 4.962 | 22.973 | 1.38218 | 1.32385 | 1.26672 | 1.20874 | 1.15236 |
| 76 | 2.1488 | 4.654 | 18.688 | 1.32379 | 1.2722 | 1.21929 | 1.16683 | 1.11561 |
| 77 | 2.2998 | 4.347 | 18.738 | 1.31803 | 1.268 | 1.21629 | 1.16489 | 1.11504 |
| 78 | 2.2864 | 4.374 | 19.884 | 1.34083 | 1.287 | 1.2327 | 1.17856 | 1.1265 |
| 79 | 2.2975 | 4.353 | 19.388 | 1.33071 | 1.27809 | 1.22556 | 1.17286 | 1.12098 |
| 80 | 2.0906 | 4.783 | 21.276 | 1.37122 | 1.31423 | 1.25607 | 1.19757 | 1.14182 |
| 81 | 2.13 | 4.695 | 20.057 | 1.35741 | 1.30102 | 1.24333 | 1.18675 | 1.13197 |
| 82 | 2.1678 | 4.613 | 19.969 | 1.34472 | 1.29095 | 1.23528 | 1.18065 | 1.12736 |
| 83 | 2.1589 | 4.632 | 18.896 | 1.329 | 1.27649 | 1.22371 | 1.17123 | 1.11917 |
| 84 | 2.2463 | 4.452 | 18.523 | 1.32491 | 1.27313 | 1.21948 | 1.16693 | 1.11572 |
| 85 | 2.2976 | 4.352 | 16.622 | 1.30399 | 1.25396 | 1.20268 | 1.15156 | 1.1017 |
| 86 | 2.2671 | 4.411 | 18.32 | 1.32441 | 1.27306 | 1.21981 | 1.16664 | 1.11512 |
| 87 | 2.2463 | 4.452 | 18.602 | 1.32632 | 1.27472 | 1.2206 | 1.16779 | 1.11687 |
| 88 | 2.0473 | 4.884 | 21.162 | 1.36362 | 1.30745 | 1.25004 | 1.19367 | 1.13859 |
| 89 | 2.2007 | 4.554 | 19.417 | 1.33632 | 1.28315 | 1.22886 | 1.17485 | 1.12235 |
| 90 | 2.1438 | 4.665 | 19.527 | 1.34144 | 1.2888 | 1.23346 | 1.17853 | 1.12531 |
| 91 | 1.8547 | 5.392 | 20.836 | 1.36907 | 1.31013 | 1.25031 | 1.19317 | 1.1377 |
| 92 | 2.0774 | 4.814 | 20.087 | 1.35234 | 1.29574 | 1.23913 | 1.18434 | 1.13028 |
| 93 | 2.1497 | 4.652 | 17.795 | 1.31739 | 1.26636 | 1.21328 | 1.16116 | 1.10992 |
| 94 | 2.283 | 4.38 | 17.456 | 1.3136 | 1.26354 | 1.20979 | 1.15801 | 1.1076 |
| 95 | 2.2089 | 4.527 | 17.097 | 1.31443 | 1.26325 | 1.20981 | 1.15761 | 1.10615 |
| 96 | 2.2426 | 4.459 | 20.263 | 1.35673 | 1.30057 | 1.24487 | 1.18916 | 1.13431 |
| 97 | 2.2176 | 4.509 | 21.598 | 1.36288 | 1.31097 | 1.25517 | 1.19863 | 1.1439 |
| 98 | 2.2328 | 4.479 | 21.107 | 1.36444 | 1.31037 | 1.25307 | 1.19667 | 1.14146 |
| 99 | 2.2047 | 4.536 | 22.199 | 1.37073 | 1.31345 | 1.25697 | 1.19981 | 1.14498 |

| Batch | Frequency 10 | Frequency 15.8 | Frequency 25 | Frequency 39.8 | Frequency 63.09 | Frequency 100 | ODR Prediction | Uniloy Swell |
|---|---|---|---|---|---|---|---|---|
| 1 | 1.11005 | 1.05672 | 1.00279 | 0.95076 | 0.90035 | 0.85093 | 6.28 | 6.3 |
| 2 | 1.10451 | 1.05153 | 0.99854 | 0.94696 | 0.89702 | 0.84811 | 6.26 | 6.29 |
| 3 | 1.10046 | 1.104763 | 0.99427 | 0.9429 | 0.89288 | 0.84394 | 6.24 | 6.25 |
| 4 | 1.10344 | 1.05147 | 0.99887 | 0.94802 | 0.89815 | 0.84931 | 6.27 | 6.31 |
| 5 | 1.10331 | 1.0506 | 0.99781 | 0.94687 | 0.89646 | 0.84737 | 6.26 | 6.3 |
| 6 | 1.09945 | 1.0478 | 0.99508 | 0.94435 | 0.89507 | 0.84639 | 6.24 | 6.25 |
| 7 | 1.09346 | 1.04176 | 0.99025 | 0.94007 | 0.8912 | 0.84355 | 6.22 | 6.25 |
| 8 | 1.1137 | 1.05969 | 1.00564 | 0.95315 | 0.90241 | 0.85297 | 6.30 | 6.31 |
| 9 | 1.11183 | 1.05836 | 1.00507 | 0.9533 | 0.90343 | 0.85433 | 6.30 | 6.31 |
| 10 | 1.1022 | 1.04843 | 0.99492 | 0.94301 | 0.8924 | 0.84326 | 6.24 | 6.24 |
| 11 | 1.10813 | 1.05522 | 1.00213 | 0.951 | 0.90136 | 0.85259 | 6.28 | 6.29 |
| 12 | 1.10243 | 1.05047 | 0.99833 | 0.9478 | 0.8988 | 0.8508 | 6.25 | 6.25 |
| 13 | 1.08441 | 1.03259 | 0.98078 | 0.93082 | 0.88194 | 0.83415 | 6.18 | 6.14 |
| 14 | 1.07152 | 1.02182 | 0.97171 | 0.92335 | 0.87574 | 0.82922 | 6.16 | 6.14 |

TABLE 5-continued

AD60007 Swell Model (Frequency Sweep)

| | | | | | | | | |
|---|---|---|---|---|---|---|---|---|
| 15 | 1.07167 | 1.02221 | 0.97224 | 0.92383 | 0.87619 | 0.82955 | 6.16 | 6.13 |
| 16 | 1.07066 | 1.02089 | 0.97078 | 0.9226 | 0.87513 | 0.82857 | 6.16 | 6.13 |
| 17 | 1.07648 | 1.02521 | 0.97393 | 0.92446 | 0.87597 | 0.82871 | 6.16 | 6.09 |
| 18 | 1.0778 | 1.0266 | 0.97537 | 0.92604 | 0.87752 | 0.83019 | 6.17 | 6.12 |
| 19 | 1.07583 | 1.02626 | 0.97642 | 0.9282 | 0.88123 | 0.83481 | 6.13 | 6.12 |
| 20 | 1.07502 | 1.02412 | 0.97318 | 0.92386 | 0.87582 | 0.82859 | 6.17 | 6.12 |
| 21 | 1.06945 | 1.02001 | 0.97041 | 0.92268 | 0.87235 | 0.82934 | 6.15 | 6.13 |
| 22 | 1.05966 | 1.01124 | 0.96217 | 0.91492 | 0.86817 | 0.82231 | 6.15 | 6.12 |
| 23 | 1.07953 | 1.02747 | 0.97541 | 0.92483 | 0.87545 | 0.82723 | 6.18 | 6.15 |
| 24 | 1.08528 | 1.03222 | 0.97947 | 0.92794 | 0.87774 | 0.82862 | 6.20 | 6.18 |
| 25 | 1.10127 | 1.04623 | 0.99076 | 0.93733 | 0.88498 | 0.83418 | 6.23 | 6.21 |
| 26 | 1.08508 | 1.03228 | 0.97929 | 0.92795 | 0.87776 | 0.82882 | 6.20 | 6.2 |
| 27 | 1.09889 | 1.04494 | 0.99091 | 0.93859 | 0.88795 | 0.8385 | 6.22 | 6.18 |
| 28 | 1.08082 | 1.02925 | 0.97741 | 0.9269 | 0.87782 | 0.82952 | 6.19 | 6.21 |
| 29 | 1.08417 | 1.03201 | 0.97964 | 0.92914 | 0.87952 | 0.83119 | 6.19 | 6.17 |
| 30 | 1.09221 | 1.03883 | 0.98569 | 0.93416 | 0.88042 | 0.83429 | 6.20 | 6.2 |
| 31 | 1.08059 | 1.02888 | 0.97734 | 0.92764 | 0.87894 | 0.83115 | 6.13 | 6.13 |
| 32 | 1.07864 | 1.02857 | 0.97802 | 0.92917 | 0.88166 | 0.83479 | 6.17 | 6.18 |
| 33 | 1.078 | 1.02767 | 0.97748 | 0.92866 | 0.88133 | 0.83467 | 6.16 | 6.2 |
| 34 | 1.08196 | 1.03085 | 0.97991 | 0.93088 | 0.88284 | 0.836 | 6.17 | 6.19 |
| 35 | 1.08332 | 1.03252 | 0.98226 | 0.93345 | 0.88555 | 0.8389 | 6.18 | 6.2 |
| 36 | 1.0759 | 1.02586 | 0.97513 | 0.92623 | 0.87822 | 0.83103 | 6.17 | 6.14 |
| 37 | 1.07512 | 1.02526 | 0.975 | 0.92645 | 0.87863 | 0.83139 | 6.17 | 6.19 |
| 38 | 1.07857 | 1.02801 | 0.97697 | 0.92766 | 0.87936 | 0.8315 | 6.18 | 6.2 |
| 39 | 1.06914 | 1.01958 | 0.96964 | 0.92123 | 0.8735 | 0.82667 | 6.17 | 6.21 |
| 40 | 1.07138 | 1.02244 | 0.97345 | 0.92609 | 0.87942 | 0.83356 | 6.15 | 6.18 |
| 41 | 1.07466 | 1.02463 | 0.9738 | 0.92491 | 0.87663 | 0.82946 | 6.18 | 6.22 |
| 42 | 1.08417 | 1.03295 | 0.98093 | 0.93067 | 0.88174 | 0.83358 | 6.20 | 6.22 |
| 43 | 1.07605 | 1.02621 | 0.97563 | 0.92638 | 0.8784 | 0.83098 | 6.18 | 6.21 |
| 44 | 1.11948 | 1.05155 | 1.00202 | 0.9457 | 0.8907 | 0.83723 | 6.27 | 6.25 |
| 45 | 1.11348 | 1.05687 | 1.00002 | 0.94535 | 0.89209 | 0.84004 | 6.26 | 6.26 |
| 46 | 1.10602 | 1.05042 | 0.99456 | 0.94043 | 0.88785 | 0.83619 | 6.25 | 6.24 |
| 47 | 1.11142 | 1.05444 | 0.99705 | 0.94199 | 0.88798 | 0.83535 | 6.25 | 6.26 |
| 48 | 1.12522 | 1.06555 | 1.00619 | 0.94915 | 0.89337 | 0.83949 | 6.27 | 6.28 |
| 49 | 1.11501 | 1.05686 | 0.99832 | 0.94227 | 0.8875 | 0.83425 | 6.25 | 6.29 |
| 50 | 1.12146 | 1.0645 | 1.00694 | 0.95187 | 0.89765 | 0.84539 | 6.29 | 6.28 |
| 51 | 1.08552 | 1.03362 | 0.98189 | 0.93183 | 0.88296 | 0.83485 | 6.18 | 6.18 |
| 52 | 1.09176 | 1.04021 | 0.98846 | 0.93854 | 0.89005 | 0.8422 | 6.20 | 6.19 |
| 53 | 1.09451 | 1.04199 | 0.98987 | 0.93934 | 0.89056 | 0.84241 | 6.20 | 6.16 |
| 54 | 1.06926 | 1.01937 | 0.96936 | 0.92076 | 0.8733 | 0.82638 | 6.16 | 6.15 |
| 55 | 1.09243 | 1.0392 | 0.98657 | 0.93585 | 0.8861 | 0.83764 | 6.20 | 6.24 |
| 56 | 1.09882 | 1.04538 | 0.99198 | 0.94043 | 0.89071 | 0.84218 | 6.21 | 6.22 |
| 57 | 1.08007 | 1.02846 | 0.97665 | 0.927 | 0.87848 | 0.831 | 6.18 | 6.18 |
| 58 | 1.07708 | 1.02546 | 0.97382 | 0.92424 | 0.87563 | 0.82829 | 6.17 | 6.16 |
| 59 | 1.08307 | 1.03117 | 0.97897 | 0.92908 | 0.88003 | 0.83237 | 6.18 | 6.16 |
| 60 | 1.08826 | 1.03533 | 0.98262 | 0.93167 | 0.88232 | 0.83418 | 6.18 | 6.17 |
| 61 | 1.08068 | 1.02868 | 0.97667 | 0.92664 | 0.87784 | 0.83006 | 6.17 | 6.16 |
| 62 | 1.07256 | 1.02102 | 0.96952 | 0.92026 | 0.87163 | 0.82452 | 6.16 | 6.18 |
| 63 | 1.09091 | 1.03815 | 0.98515 | 0.93418 | 0.8842 | 0.83584 | 6.20 | 6.17 |
| 64 | 1.08734 | 1.03539 | 0.98329 | 0.93286 | 0.88401 | 0.83634 | 6.19 | 6.19 |
| 65 | 1.08892 | 1.036 | 0.98307 | 0.93179 | 0.88218 | 0.83371 | 6.19 | 6.17 |
| 66 | 1.07477 | 1.02396 | 0.97317 | 0.92424 | 0.87572 | 0.8286 | 6.17 | 6.19 |
| 67 | 1.09166 | 1.03822 | 0.98509 | 0.93371 | 0.8841 | 0.83539 | 6.19 | 6.21 |
| 68 | 1.07614 | 1.02394 | 0.97162 | 0.92127 | 0.87203 | 0.82398 | 6.17 | 6.22 |
| 69 | 1.07841 | 1.02582 | 0.97317 | 0.92258 | 0.87297 | 0.82489 | 6.18 | 6.22 |
| 70 | 1.07966 | 1.02698 | 0.97432 | 0.92373 | 0.87421 | 0.82611 | 6.18 | 6.22 |
| 71 | 1.08254 | 1.0299 | 0.97724 | 0.92672 | 0.87733 | 0.82909 | 6.18 | 6.17 |
| 72 | 1.07475 | 1.02247 | 0.97047 | 0.92043 | 0.87132 | 0.82363 | 6.17 | 6.14 |
| 73 | 1.08919 | 1.03597 | 0.98295 | 0.93194 | 0.88206 | 0.8334 | 6.19 | 6.15 |
| 74 | 1.08216 | 1.02968 | 0.9769 | 0.92628 | 0.87661 | 0.82843 | 6.18 | 6.14 |
| 75 | 1.09693 | 1.0434 | 0.98971 | 0.93831 | 0.8879 | 0.83901 | 6.21 | 6.14 |
| 76 | 1.06608 | 1.01749 | 0.96882 | 0.92185 | 0.87543 | 0.83008 | 6.14 | 6.13 |
| 77 | 1.06587 | 1.0177 | 0.96913 | 0.92234 | 0.87606 | 0.8306 | 6.14 | 6.16 |
| 78 | 1.07502 | 1.0248 | 0.97462 | 0.9261 | 0.87853 | 0.8318 | 6.16 | 6.19 |
| 79 | 1.07082 | 1.02168 | 0.97236 | 0.92493 | 0.87801 | 0.83224 | 6.15 | 6.17 |
| 80 | 1.0871 | 1.03409 | 0.98085 | 0.93 | 0.88318 | 0.83169 | 6.18 | 6.17 |
| 81 | 1.07876 | 1.02683 | 0.97454 | 0.92441 | 0.87557 | 0.82763 | 6.17 | 6.17 |
| 82 | 1.07595 | 1.02549 | 0.97493 | 0.9264 | 0.8787 | 0.832 | 6.16 | 6.15 |
| 83 | 1.06867 | 1.01907 | 0.96928 | 0.92113 | 0.87377 | 0.82748 | 6.16 | 6.16 |
| 84 | 1.06576 | 1.0168 | 0.96726 | 0.91969 | 0.87291 | 0.82677 | 6.15 | 6.17 |
| 85 | 1.05301 | 1.00499 | 0.95681 | 0.91017 | 0.86439 | 0.81915 | 6.14 | 6.16 |
| 86 | 1.06509 | 1.01558 | 0.96633 | 0.91859 | 0.8716 | 0.82568 | 6.16 | 6.19 |
| 87 | 1.06637 | 1.01713 | 0.96797 | 0.9201 | 0.8734 | 0.82738 | 6.15 | 6.14 |
| 88 | 1.08482 | 1.033 | 0.98054 | 0.93011 | 0.8809 | 0.83295 | 6.18 | 6.15 |
| 89 | 1.07156 | 1.02235 | 0.97222 | 0.92448 | 0.87749 | 0.83161 | 6.15 | 6.14 |
| 90 | 1.07361 | 1.02298 | 0.97253 | 0.92395 | 0.87643 | 0.82998 | 6.15 | 6.09 |
| 91 | 1.08367 | 1.03133 | 0.97884 | 0.92871 | 0.87954 | 0.83194 | 6.17 | 6.11 |

TABLE 5-continued

AD60007 Swell Model (Frequency Sweep)

| 92 | 1.07814 | 1.02654 | 0.97524 | 0.9256  | 0.87697 | 0.82955 | 6.17 | 6.13 |
| 93 | 1.0604  | 1.01222 | 0.96365 | 0.91678 | 0.87084 | 0.82558 | 6.14 | 6.16 |
| 94 | 1.05834 | 1.01015 | 0.96187 | 0.9153  | 0.86961 | 0.82451 | 6.13 | 6.15 |
| 95 | 1.05669 | 1.00804 | 0.95939 | 0.91228 | 0.86604 | 0.82092 | 6.14 | 6.17 |
| 96 | 1.08076 | 1.0282  | 0.97559 | 0.92508 | 0.87558 | 0.82734 | 6.18 | 6.19 |
| 97 | 1.08948 | 1.03592 | 0.98258 | 0.93056 | 0.88021 | 0.83101 | 6.20 | 6.21 |
| 98 | 1.08691 | 1.03349 | 0.97983 | 0.92819 | 0.87811 | 0.82895 | 6.20 | 6.17 |
| 99 | 1.09118 | 1.0386  | 0.98602 | 0.93555 | 0.88634 | 0.8383  | 6.19 | 6.2  |

The correlation between predicted die swell, based on rheological properties other than die swell, and actual Uniloy die swell values has been demonstrated. The rheological measurements can be used for the selection of polyolefins for having a predetermined die swell, for manufacturing a blow-molded article having a predicted die swell, and for modification of a polyolefin producing process to control the die swell of the polyolefin have been demonstrated.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A method for selecting a polyolefin having a die swell within a preselected range, the method comprising:
   (a) obtaining from reference samples of a plurality of polyolefin batches, at least one data set for at least each of the tan (delta) measured at a first temperature, the tan (delta) measured at a second temperature, and melt index for each reference sample;
   (b) obtaining a die swell data set from the reference samples of the polyolefins;
   (c) correlating the tan (delta) measured at a first temperature, the tan (delta) measured at a second temperature, and melt index of said reference polyolefins and the die swell data set using a regression analysis to generate an equation for predicting the die swell as a function of the tan (delta) measured at a first temperature, the tan (delta) measured at a second temperature, and melt index;
   (d) obtaining from a non-reference polyolefin sample a value for each of the tan (delta) measured at a first temperature, the tan (delta) measured at a second temperature, and melt index and calculating the predicted die swell from the equation from step (c);
   (e) comparing the predicted die swell of step (d) to the die swell within the pre-selected range; and
   (f) rejecting the non-reference polyolefin when the predicted die swell for the nonreference polyolefin is outside of the pre-selected range of the die swell.

2. The method according to claim 1, wherein the data set from step (b) and the die swell data set from step (c) are stored on a computer.

3. The method according to claim 1, wherein the die swell data set comprises Uniloy die swell data.

4. The method according to claim 1, wherein the regression analysis is a partial least squares calculation.

5. The method according to claim 1, wherein the at least one data set further comprises data selected from polydispersity index, crossover frequency or crossover point.

6. The method according to claim 1, wherein the reference samples are selected from a powder or a pellet.

7. The method according to claim 1, wherein the polyolefin comprises a polyethylene homopolymer, a polyethylene copolymer, a polypropylene homopolymer or a polypropylene copolymer.

8. The method according to claim 1, wherein the reference samples are selected from a group consisting of a dairy grade polyethylene, a household industrial chemical grade polyethylene, and a high load melt index polyethylene.

9. A method for manufacturing a blow-molded article having a die swell within a pre-selected range, the method comprising:
   (a) obtaining from reference samples of a plurality of polyolefin batches, at least one data set for at least each of the tan (delta) measured at a first temperature, the tan (delta) measured at a second temperature, and melt index for each reference sample;
   (b) obtaining a die swell data set from the reference samples of the polyolefins;
   (c) correlating the values for each of the tan (delta) measured at a first temperature, the tan (delta) measured at a second temperature, and melt index of said reference polyolefins and the die swell data set using a regression analysis to generate an equation for predicting the die swell as a function of the tan (delta) measured at a first temperature, the tan (delta) measured at a second temperature, and melt index values;
   (d) obtaining from a non-reference polyolefin sample a value for each of the tan (delta) measured at a first temperature, the tan (delta) measured at a second temperature, and melt index and calculating the predicted die swell from the equation from step (c);
   (e) comparing the predicted die swell of step (d) to the die swell within the pre-selected range; and
   (f) blow-molding the polyolefin sample, having the predicted die swell within the preselected range, to form the blow-molded article.

10. The method according to claim 9, wherein the data set from step (b) and the die swell data set from step (c) are stored on a computer.

11. The method according to claim 9, wherein the die swell data set comprises Uniloy die swell data.

12. The method according to claim 9, wherein the regression analysis is a partial least squares calculation.

13. The method according to claim 9, wherein the at least one data set further comprises data selected from polydispersity index, crossover frequency or crossover point.

14. The method according to claim 9, wherein the reference samples are selected from a powder or a pellet.

15. The method according to claim 9, wherein the polyolefin comprises a polyethylene homopolymer, a polyethylene copolymer, a polypropylene homopolymer or a polypropylene copolymer.

16. The method according to claim 9, wherein the reference samples are selected from a group consisting of a dairy grade, a household industrial chemical grade polyethylene, and a high melt index polyethylene.

17. A method of controlling a polyolefin reactor, the method comprising:
   (a) obtaining from reference samples of a plurality of polyolefin batches, at least one data set for at least each of the tan (delta) measured at a first temperature, the tan (delta) measured at a second temperature, and melt index for each reference sample;
   (b) obtaining a die swell data set from the reference samples of the polyolefins;
   (c) correlating the values for each of the tan (delta) measured at a first temperature, the tan (delta) measured at a second temperature, and melt index of said reference polyolefins and the die swell data set using a regression analysis to generate an equation for predicting the die swell as a function of the tan (delta) measured at a first temperature, the tan (delta) measured at a second temperature, and melt index values;
   (d) obtaining from a non-reference polyolefin sample a value for each of the tan (delta) measured at a first temperature, the tan (delta) measured at a second temperature, and melt index and calculating the predicted die swell from the equation from step (c);
   (e) comparing the predicted die swell of step (d) to a control value for die swell; and
   (f) modifying at least one reactor condition to reduce a difference between the control value and the predicted die swell for the polyolefin sample from the reactor.

18. The method according to claim 17, wherein the data set from step (b) and the die swell data set from step (c) are stored on a computer.

19. The method according to claim 17, wherein the die swell data set comprises Uniloy die swell data.

20. The method according to claim 17, wherein the regression analysis is a partial least squares calculation.

21. The method according to claim 17, wherein the at least one data set further comprises data selected from polydispersity index, crossover frequency or crossover point.

22. The method according to claim 17, wherein the reference samples are selected from a powder or a pellet.

23. The method according to claim 17, wherein the polyolefin comprises a polyethylene homopolymer, a polyethylene copolymer, a polypropylene homopolymer or a polypropylene copolymer.

24. The method according to claim 17, wherein the reference samples are selected from a group consisting of a dairy grade polyethylene, a household industrial chemical grade polyethylene, and a high melt index polyethylene.

25. The method according to claim 17, wherein the at least one reactor condition is selected from temperature, hydrogen concentration or olefin concentration.

* * * * *